US010499426B2

(12) United States Patent
Oh et al.

(10) Patent No.: US 10,499,426 B2
(45) Date of Patent: Dec. 3, 2019

(54) METHOD AND APPARATUS FOR CHANNEL SENSING IN COMMUNICATION SYSTEM

(71) Applicant: Samsung Electronics Co., Ltd, Gyeonggi-do (KR)

(72) Inventors: Jin-Young Oh, Seoul (KR); Dong-Han Kim, Gyeonggi-do (KR); Tae-Han Bae, Seoul (KR); Cheol-Kyu Shin, Gyeonggi-do (KR); Seung-Hoon Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 15/361,301

(22) Filed: Nov. 25, 2016

(65) Prior Publication Data
US 2017/0150524 A1 May 25, 2017

(30) Foreign Application Priority Data

Nov. 25, 2015 (KR) .................. 10-2015-0165369

(51) Int. Cl.
*H04J 3/00* (2006.01)
*H04W 74/08* (2009.01)
(Continued)

(52) U.S. Cl.
CPC ... *H04W 74/0808* (2013.01); *H04W 72/0446* (2013.01); *H04W 88/02* (2013.01); *H04W 88/08* (2013.01)

(58) Field of Classification Search
None
See application file for complete search history.

(56) References Cited

U.S. PATENT DOCUMENTS

2013/0051358 A1* 2/2013 Turtinen ........... H04W 74/0816
370/330
2013/0235905 A1* 9/2013 Serizawa ............... H04B 1/713
375/132

(Continued)

FOREIGN PATENT DOCUMENTS

KR 1020140010450 A 1/2014
KR 1020150096283 A 8/2015
WO 2015084095 A1 6/2015

OTHER PUBLICATIONS

Baoan Jia, "A channel sensing based design for LTE in unlicensed bands," Communication Workshop (ICCW), 2015 IEEE International Conference, Jun. 8, 2015, pp. 2332-2337.
(Continued)

*Primary Examiner* — Phirin Sam

(57) ABSTRACT

Provided herein are communication schemes for combining 5G communication systems with IoT technology to support higher data transmission rate as post-4G systems and systems for the same. The present disclosure may be used in intelligent services (e.g., smart home, smart building, smart city, smart car, connected car, health-care, digital education, retail business, security and safety-related services) based on the 5G communication technology and IoT-related techniques. According to an embodiment of the present disclosure, a method for sensing a channel by a base station in a communication system comprises setting a channel sensing interval for sensing a channel available on an unlicensed band, based on a first start time when the base station starts a signal transmission and the set channel sensing interval, setting a second start time when a channel sensing operation starts, and performing the channel sensing operation during the channel sensing interval from the set second start time.

16 Claims, 10 Drawing Sheets

(51) Int. Cl.
  *H04W 72/04* (2009.01)
  *H04W 88/02* (2009.01)
  *H04W 88/08* (2009.01)

(56) References Cited

U.S. PATENT DOCUMENTS

| | | | | |
|---|---|---|---|---|
| 2013/0294356 | A1* | 11/2013 | Bala | H04W 16/14 |
| | | | | 370/329 |
| 2014/0036853 | A1* | 2/2014 | Kim | H04W 16/14 |
| | | | | 370/329 |
| 2015/0043456 | A1* | 2/2015 | Rikkinen | H04B 1/7143 |
| | | | | 370/329 |
| 2015/0103777 | A1 | 4/2015 | Chen et al. | |
| 2015/0222410 | A1* | 8/2015 | Belghoul | H04W 28/085 |
| | | | | 370/252 |
| 2015/0223115 | A1* | 8/2015 | Liang | H04W 28/085 |
| | | | | 370/235 |
| 2015/0223243 | A1* | 8/2015 | Tabet | H04W 28/085 |
| | | | | 370/330 |
| 2016/0050601 | A1 | 2/2016 | Jeong et al. | |
| 2016/0105897 | A1* | 4/2016 | Liu | H04W 72/1226 |
| | | | | 370/235 |
| 2016/0142920 | A1* | 5/2016 | Suzuki | H04W 16/14 |
| | | | | 370/336 |
| 2016/0269183 | A1* | 9/2016 | Cherian | H04W 12/06 |
| 2017/0026945 | A1* | 1/2017 | Han | H04L 5/0098 |
| 2017/0142751 | A1* | 5/2017 | Liu | H04L 5/1415 |
| 2017/0202018 | A1* | 7/2017 | Cha | H04W 74/0816 |
| 2017/0317798 | A1* | 11/2017 | Kim | H04W 72/12 |
| 2017/0366308 | A1* | 12/2017 | Choi | H04L 1/1887 |
| 2018/0213561 | A1* | 7/2018 | Bhorkar | H04L 5/005 |
| 2018/0255578 | A1* | 9/2018 | Kim | H04L 5/001 |
| 2018/0302926 | A1* | 10/2018 | Bhorkar | H04W 28/065 |

OTHER PUBLICATIONS

ISA/KR, "International Search Report," Application No. PCT/KR2016/013617, dated Feb. 20, 2017, Korean Intellectual Property Office, Daejeon, Korea, 3 pages.

ISA/KR, "Written Opinion of the International Searching Authority," Application No. PCT/KR2016/013617, dated Feb. 20, 2017, Korean Intellectual Property Office, Daejeon, Korea, 5 pages.

* cited by examiner

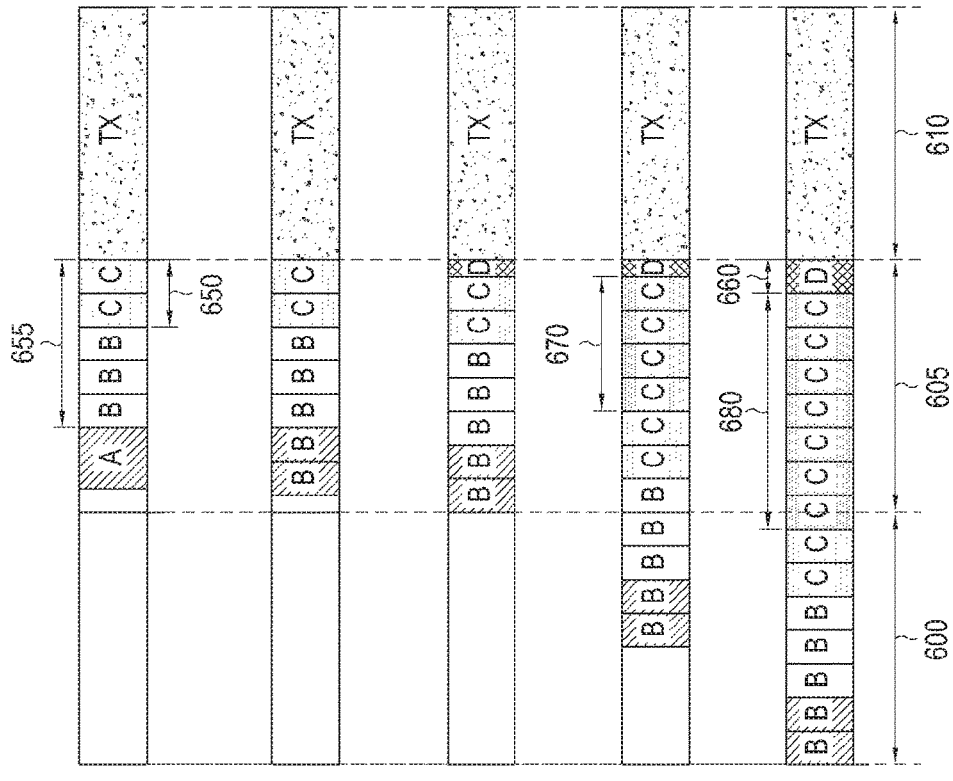
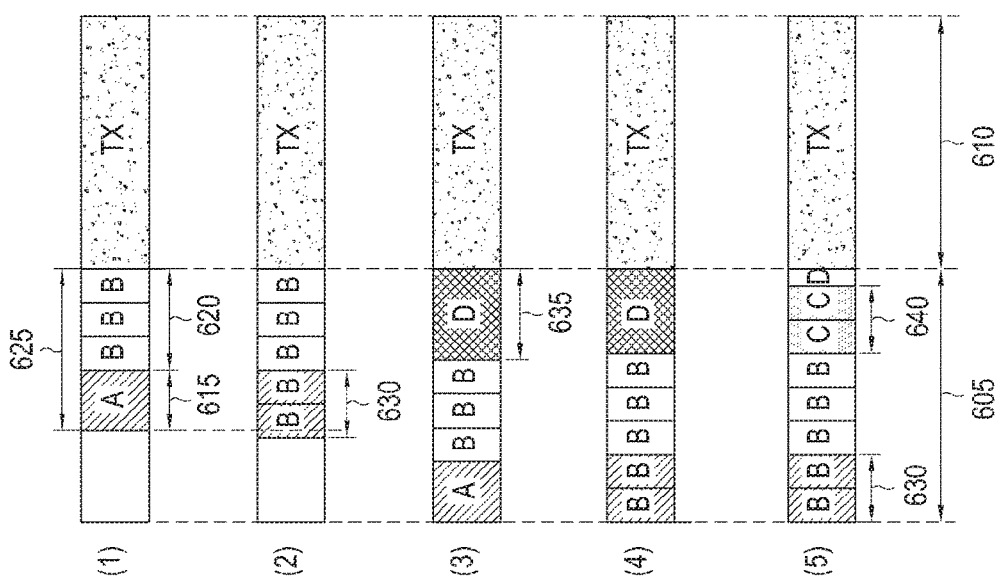
FIG.6A
FIG.6B

METHOD AND APPARATUS FOR CHANNEL SENSING IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Nov. 25, 2015 and assigned Serial No. 10-2015-0165369, the entire disclosure of which is incorporated herein by reference.

TECHNICAL FIELD

The present disclosure relates to channel sensing methods and apparatuses for unlicensed bands in communication systems.

BACKGROUND

In order to meet the demand for wireless data traffic soaring since the 4th generation (4G) communication system came to the market, there are ongoing efforts to develop enhanced 5th generation (5G) communication systems or pre-5G communication systems. For the above reasons, the 5G communication system or pre-5G communication system is called the beyond 4G network communication system or post long-term evolution (LTE) system.

For higher data transmit rates, 5G communication systems are considered to be implemented on ultra-high frequency bands (mmWave), such as, e.g., 60 GHz. To mitigate path loss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network as a Big data processing technique may be said to be an example of the convergence of the 5G and IoT technologies.

The above information is presented as background information only to assist with an understanding of the present disclosure. No determination has been made, and no assertion is made, as to whether any of the above might be applicable as prior art with regard to the present disclosure.

SUMMARY

According to an embodiment of the present disclosure, there are provided a method and apparatus for sensing a channel for an unlicensed band in a mobile communication system.

According to an embodiment of the present disclosure, there are provided a method and apparatus for setting up a time of performing a channel sensing operation for an unlicensed band and performing the channel sensing operation according to the set time in a mobile communication system.

According to an embodiment of the present disclosure, a method for sensing a channel by a base station in a communication system comprises setting a channel sensing interval for sensing a channel available on an unlicensed band, based on a first start time when the base station starts a signal transmission and the set channel sensing interval, setting a second start time when a channel sensing operation starts, and performing the channel sensing operation during the channel sensing interval from the set second start time.

According to an embodiment of the present disclosure, a method for sensing a channel by a user equipment (UE) in a communication system comprises receiving, from a base station, information for setting a channel sensing interval for sensing a channel available on an unlicensed band, setting the channel sensing interval based on the received information, based on a first start time when the UE starts a signal transmission and the set channel sensing interval, setting a second start time when a channel sensing operation starts, and performing the channel sensing operation during the channel sensing interval from the set second start time.

According to an embodiment of the present disclosure, a base station sensing a channel in a communication system comprises a transceiver configured to transmit and receive data and a controller configured to set a channel sensing interval for sensing a channel available on an unlicensed band, based on a first start time when the base station starts a signal transmission and the set channel sensing interval, set a second start time when a channel sensing operation starts, perform the channel sensing operation during the channel sensing interval from the set second start time, and control the transceiver to transmit a signal through the sensed channel.

According to an embodiment of the present disclosure, a user equipment (UE) sensing a channel in a communication system comprises a transceiver configured to transmit and receive data and a controller configured to receive, from a base station, information for setting a channel sensing interval for sensing a channel available on an unlicensed band, set the channel sensing interval based on the received information, based on a first start time when the UE starts a signal transmission and the set channel sensing interval, set a second start time when a channel sensing operation starts, and perform the channel sensing operation during the channel sensing interval from the set second start time.

Other embodiments, aspects, advantages, and core features of the present disclosure will be apparent to one of ordinary skill in the art from the following detailed description taken in conjunction with the accompanying drawings and disclosing preferred embodiments of the present disclosure.

Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" or "apparatus" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

According to embodiments of the present disclosure, a channel sensing operation for using an unlicensed band in a mobile communication system may be more efficiently performed, and a reference for the channel sensing operation may be more clearly set up, thereby enhancing the capability of channel sensing operation on an unlicensed band.

Meanwhile, other various effects are implicitly or explicitly disclosed by the detailed description of embodiments of the present disclosure.

Other embodiments, aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrate start times when a base station performs a channel sensing operation in a communication system according to an embodiment of the present disclosure;

It should be noted that the same or similar reference denotations may be used to refer to the same or similar elements, features, or structures throughout the drawings.

DETAILED DESCRIPTION

Figure 1A:
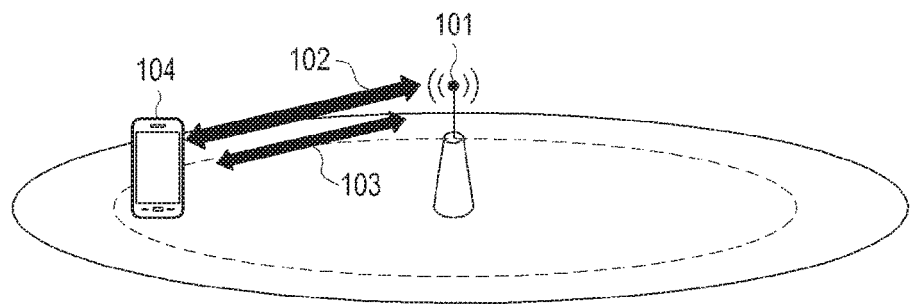
FIGS. 1A and 1B illustrate a communication system according to an embodiment of the present disclosure.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The following detailed description taken in conjunction with the accompanying drawings is provided for a comprehensive understanding of various embodiments of the present disclosure which are defined by the appended claims or equivalents thereof. However, various particular matters set forth below in the detailed description should be regarded simply as examples. Hence, it should be appreciated by one of ordinary skill in the art that various changes or modifications may be made to the embodiments described herein without departing from the spirit or scope of the present disclosure. Known functions and components related to the present disclosure may be excluded from the description for clarity and brevity.

The terms and words used herein should not be interpreted as limited to their literal meanings, and it should be noted that they are rather provided merely for a clear and consistent understanding of the present disclosure. Thus, it is apparent to one of ordinary skill in the art that the detailed description of various embodiments of the present disclosure is intended for description purposes alone, but not for limiting the subject matter of the present disclosure defined by the appended claims and equivalents thereof.

As used herein, the singular forms "a," "an," and "the" are intended to include the plural forms as well, unless the context clearly indicates otherwise. Accordingly, as an example, a "component surface" includes one or more component representations.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. Such terms as those generally defined in the dictionary should be appreciated to be consistent with contextual meanings of relevant technology.

Recent mobile communication systems are evolving to high-speed, high-quality wireless packet data communication systems to provide data services and multimedia services beyond the initial versions that have provided voice-centered services. To support such high-rate, high-definition radio packet data transmission services, various mobile communication standards have been developed, such as third generation partnership project (3GPP), high speed uplink packet access (HSUPA), long-term evolution (LTE), LTE-advanced (LTE-A), and 3GPP2 high rate packet data (HRPD) and institute of electrical and electronics engineers (IEEE) 802.16.

In particular, the LTE/LTE-A (hereinafter, LTE) system is steadily going on for standardization and evolution for enhanced system capability and frequency efficiency. Representatively, the LTE communication system happened to be able to sharply increase data transmission rate and system capability using carrier aggregation (CA) by which the system may be operated via multiple frequency bands. However, the frequency band operated by the current LTE communication system is the licensed band (the licensed spectrum or licensed carrier) which the service provider generally has a dedicated right to use. However, the frequency band (e.g., a 5 GHz or less frequency band) on which mobile communication services are generally being offered is occupied and used by other service providers or other communication systems. Thus, the service provider has difficulty securing multiple licensed bands, resultantly troubling him in expanding the system capability. Hence, technology (e.g., LTE in unlicensed (LTE-U) and licensed-assisted access (LAA)) for utilizing LTE communication systems on unlicensed bands is recently being researched in order to process soaring mobile data traffic under an environment where a licensed band frequency is difficult to secure. Here, unlicensed band refers to a band for an unlicensed spectrum or unlicensed carrier. In particular, among unlicensed bands, the 5 GHz band is being used by a relatively smaller number of apparatuses as compared with the 2.4 GHz unlicensed band and allows for utilization of a very broad bandwidth, rendering it easy to secure additional frequency bands. In other words, a licensed band and unlicensed band may be put to use by using the CA technology of LTE communication system where integrates and uses multiple frequency bands. That is, a cell (LTE cell) on a licensed band may be set as a primary cell (PCell or Pcell), and a cell (LAA cell or LTE-U cell) on an unlicensed band may be set as a second cell (SCell or Scell), and the licensed band and unlicensed band may be operated using the legacy CA technology. In this case, the LTE communication system may be applicable to the dual-connectivity environment where the licensed band and the unlicensed band are connected with each other via a non-ideal backhaul as well as the CA where the licensed band and the unlicensed band are connected with each other via an ideal backhaul. However, the description of the present disclosure is made assuming a CA environment where the unlicensed band and licensed band are connected together via an ideal backhaul.

Generally, the LTE communication system transmits data using an orthogonal frequency division multiple access (OFDMA) transmission scheme. In the OFDM scheme, a modulated signal is positioned in a 2-dimensional resource constituted of time and frequency. The resources on the time axis are differentiated by different OFDM symbols and they are orthogonal to each other. The resources on the frequency axis are differentiated by different subcarriers and they are also orthogonal to each other. That is, in the OFDM scheme, one minimum unit resource may be indicated by designating a particular OFDM symbol on the time axis and a particular subcarrier on the frequency axis, and this is called a resource element (RE). Since different REs maintain the orthogonality even when undergoing frequency selective channel, signals transmitted via different REs may be received on the reception side without mutual interference. In the OFDM communication system, a downlink bandwidth includes multiple resource blocks (RBs), and each physical resource block (PRB) may include 12 subcarriers arranged along the frequency axis and 14 or 12 OFDM symbols arranged along the time axis. Here, the PRB is a basic unit for resource allocation.

The reference signal (RS) is a signal that is received from the base station and by which a user equipment ("UE") may perform channel estimation, and the reference signals for the LTE communication system include the common reference signal (CRS) and the demodulation reference signal (DMRS), a dedicated reference signal. The CRS is a reference signal transmitted over the overall downlink band and receivable by all the UEs and is used for channel estimation, configuring feedback information by the UE, and demodulation of data channel. The DMRS is a reference signal transmitted over the overall downlink band. The DMRS is used for demodulation of a data channel by a particular UE and channel estimation, but not used for configuring feedback information unlike the CRS. Accordingly, the DMRS is transmitted through a PRB resource that is to be scheduled by the UE.

A subframe on the time axis consists of two 0.5 msec-long slots, i.e., a first slot and a second slot. The physical dedicated control channel (PDCCH) region that is a control channel region and the enhanced PDCCH (ePDCCH) region that is a data channel region are split on the time axis and transmitted. This is for quickly receiving and demodulating control channel signals. Further, the PDCCH region is positioned on the overall downlink band and this has the form that one control channel is split into smaller units of control channels that are distributed and positioned over the entire downlink band. The uplink is largely split into the physical uplink control channel (PUCCH) and the physical uplink data channel (PUSCH) and is transmitted via the control channel if there is no response channel for the downlink data channel and no other feedback information is included in the data channel and via the data channel if there is a data channel.

Figure 1B:
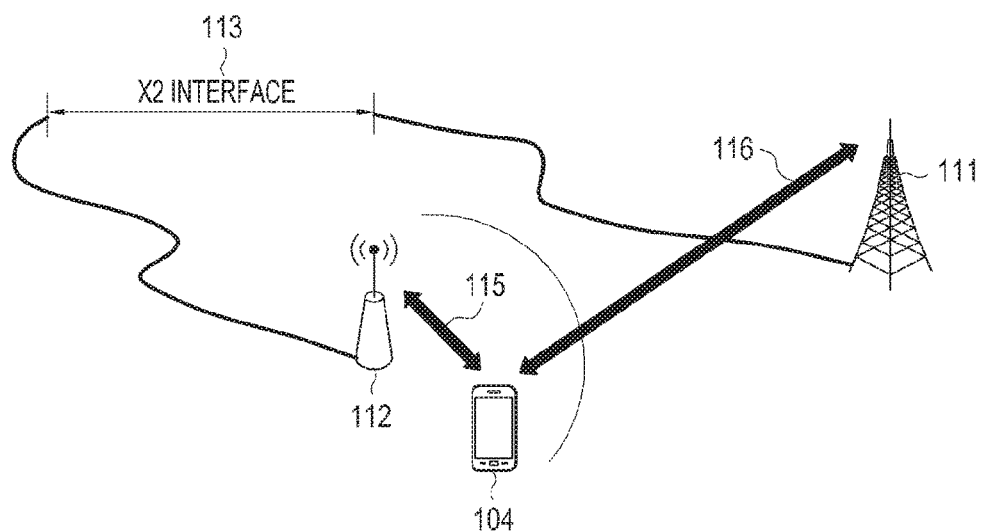

FIGS. 1A and 1B are views illustrating a communication system according to an embodiment of the present disclosure.

Referring to FIGS. 1A and 1B, FIG. 1A illustrates an example in which an LTE cell 102 and an LAA cell 103 co-exist in one small base station 101 over the network. The UE 104 communicates data with the base station 101 through the LTE cell 102 and the LAA cell 103. Here, no limitation is imposed on the dual scheme of the LTE cell 102 or LAA cell 103. A cell performing a data transmission/reception operation using a licensed band may be assumed to be the LTE cell 102 or Pcell while a cell performing a data transmission/reception operation using an unlicensed band may be assumed to be the LAA cell 103 or SCell. However, uplink transmission may be limited to be performed only through the LTE cell 102 when the LTE cell is a PCell.

FIG. 1B illustrates an example in which an LTE macro base station 111 for larger coverage and an LAA small base station 112 for increasing data transmission are installed in a communication network. Here, the UE 104 may perform communication 116 with the LTE macro base station 111 and communication 115 with the LAA small base station 112. Here, no limitation is imposed on the dual scheme of the LTE macro base station 111 or LAA small base station 112, and the LTE macro base station 111 may be replaced with a LTE small base station. Further, uplink transmission may be set to be made only through the LTE base station 111 when the LTE base station is of a PCell. At this time, the LTE base station 111 and the LAA base station 112 are assumed to have an ideal backhaul network. Thus, communication may be achieved via a rapid inter-base station X2 interface 113, so that, even when uplink transmission is made only to the LTE base station 111, the LAA base station 112 may receive, in real-time, relevant control information from the LTE base station 111 via the X2 interface 113.

The embodiments proposed herein may be applicable to both the system of FIG. 1A and the system of FIG. 1B.

Generally, for the unlicensed band, the same frequency band or channel is shared and used by a plurality of apparatuses. In this case, apparatuses using the unlicensed band may be systems different from each other. Accordingly, typical operations of the apparatuses operated on the unlicensed band for mutual co-existence among various apparatuses are as follows.

A transmission apparatus requiring signal transmissions including data or control signals identify whether the unlicensed band or channel where the signal transmission is performed is occupied by other apparatuses before performing the signal transmission, and depending on the determined channel occupancy state, may or may not occupy the channel. Such operation is generally called listen-before-talk (LBT). In other words, the transmission apparatus should determine whether it may occupy the channel by a method previously defined or set. Here, a method for sensing the channel may be previously defined or set. Further, a time of sensing the channel may be defined or set previously or chosen as a value within a particular range. Further, the time of sensing the channel may be set in proportion to a maximum channel occupancy time as set. Here, an operation for sensing a channel is performed to determine whether the channel may be occupied. The channel sensing operation for sensing a channel may be set differently depending on unlicensed frequency bands on which the operation is to be performed or per-local or country regulations. For example, in the U.S., the unlicensed band may be used without a separate channel sensing operation other than the operation for radar sensing on the 5 GHz frequency band.

The transmission apparatus to use the unlicensed band may sense whether other apparatuses use the channel through the above-described channel sensing operation (or LBT), and if not sensing the channel occupancy by other apparatuses, may occupy and use the channel. Here, the apparatuses using the unlicensed band may previously define or set the maximum channel occupancy time during which they may consecutively occupy the channel after the channel sensing operation and operate depending thereon. In this case, the maximum occupancy time may be previously defined depending on frequency bands or locally defined regulations or may be separately set by other apparatus, e.g., by a base station when it is a UE. Here, the channel occupancy time may be set differently depending on the unlicensed band or per-local or per-country regulations. For example, in Japan, the maximum channel occupancy time on the unlicensed band of 5 GHz is limited to 4 ms. By contrast, in Europe, the channel may be consecutively occupied and used for up to 10 ms or 13 ms. In this case, the apparatuses having occupied the channel during the maximum channel occupancy time may re-perform the channel sensing operation and may then re-occupy the channel depending on the result of the channel sensing. The operations of channel sensing and occupying on the unlicensed band are described below with reference to FIG. 2.

Figure 2:
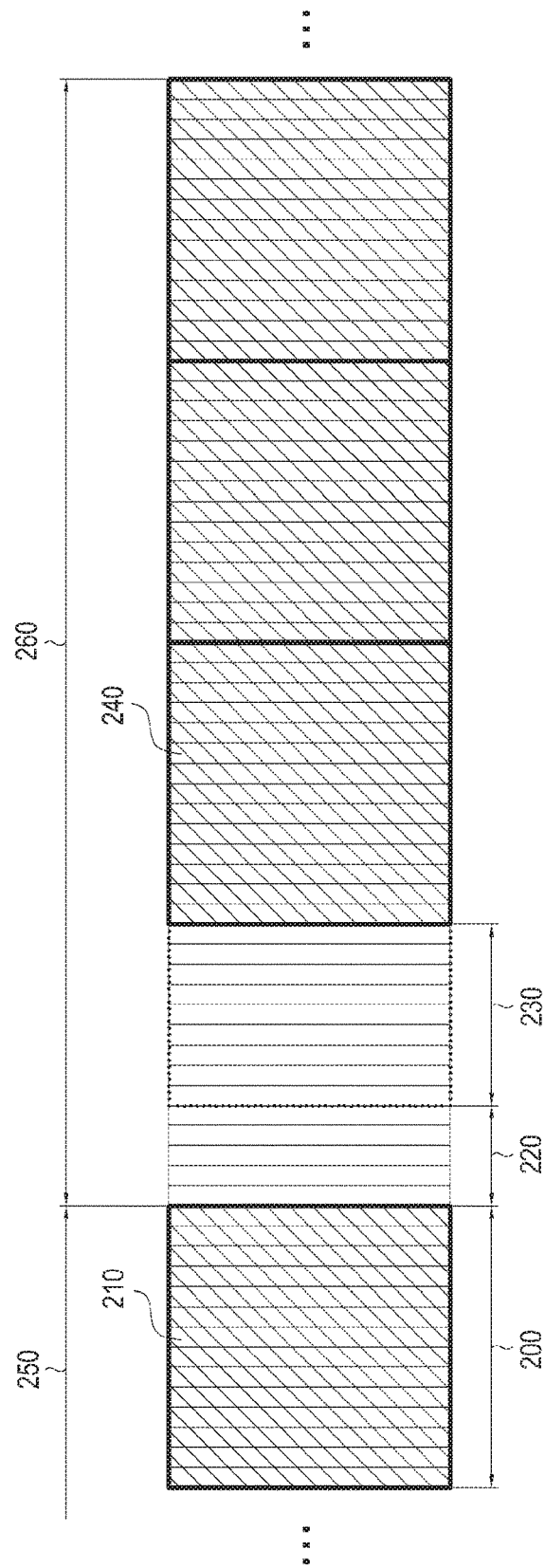
FIG. 2 illustrates an interval where a channel sensing and channel occupancy operation is performed in a communication system according to an embodiment of the present disclosure.

FIG. 2 is a view illustrating an example interval where a channel sensing and channel occupancy operation is performed in a communication system according to an embodiment of the present disclosure. FIG. 2 illustrates an example of a downlink transmission process by which a base station sends data or control signals to a UE. The downlink transmission process may also be applicable to uplink transmission where the UE sends signals to the base station.

Referring to FIG. 2, a subframe 200 may be 1 ms long and include a plurality of OFDM symbols. Here, the base station and the UE communicable on the unlicensed band may occupy a corresponding channel during channel occupancy times (or TXOP) 250 and 260 as set to perform communication. The base station that has occupied the channel during the set channel occupancy time 250, if needing additional channel occupancy, may perform a channel sensing operation in an interval 220. The base station may or may not re-occupy and use the channel depending on the result of the channel sensing operation. Here, the channel sensing interval (or length) as necessary may be previously defined between the base station and the UE or set by the base station sending a higher layer signal to the UE, or different settings may be made to the channel sensing interval depending on the result of data transmission/reception on the unlicensed band.

Further, at least one or more of variables applied to the channel sensing operation re-performed as set forth above may be set to be different from variables applied to the previous channel sensing operation.

The channel sensing and occupancy operation may be set differently depending on frequency bands or regulations defined locally or from country to country. The channel sensing and occupancy operation is specifically described taking, as an example, the load-based equipment which is a channel access scheme following the European 5 GHz band regulation EN301 893.

When the base station needs additional use of the channel after the maximum channel occupancy time 250, the base station should determine whether other apparatuses occupy the channel for a minimum channel sensing interval 220. Here, the minimum channel sensing interval 220 may be determined depending on the maximum channel occupancy interval as in Equation 1:

Maximum channel occupancy interval, $13/32 \times q$,
$(q=4, \ldots, 32)$

Minimum channel sensing interval, ECCA slot
length×rand(1, $q$)  [Equation 1]

Here, the ECCA slot length is a minimum unit (or length) of channel sensing interval previously defined or set. That is, when q=32, the transmission apparatus may occupy the unlicensed band for up to 13 ms. Here, the channel sensing interval minimally required may be selected as a value from 1 to q (i.e., from 1 to 32), and the overall channel sensing interval may be the product of the selected value and the ECCA slot length. Thus, as the maximum channel occupancy interval increases, the minimum channel sensing interval increases as well.

Meanwhile, the method for setting the maximum channel occupancy interval and the minimum channel sensing interval is a mere example, may be applied differently depending on frequency bands or locally or per-country regulations defined, and may be changed in the future as the frequency regulations are modified. Further, it may be set to include additional operations (e.g., introduction of additional channel sensing intervals) other than the channel sensing operation according to the frequency regulation.

Upon failing to sense other apparatuses to use the unlicensed band during the channel sensing interval 220, that is, when the channel is determined to be in an idle state, the base station may immediately occupy and use the channel. Here, the determination as to whether other apparatuses occupy the channel during the channel sensing interval 220 may be defined in advance or may be made using a preset reference value. For example, when the magnitude of signals received from the other apparatuses during the channel sensing interval is larger than a predetermined reference value (e.g., −62 dBm), the channel may be determined to have been occupied by the other apparatuses. When the magnitude of the signal received is smaller than the reference value, the channel may be determined to be in an idle state. At this time, the method for determining the channel occupancy may come in various ways, such as detecting a predefined signal including the magnitude of the received signal as described above.

Since operations in the general LTE system are performed in subframe units (e.g., signal transmission and reception operations are performed from the first OFDM symbols of subframes), signal transmission or reception may fail at a particular OFDM symbol immediately after a channel sensing operation is performed. Accordingly, when sensing the idle channel during the channel sensing interval 220 of the subframe, the base station may transmit a particular signal for channel occupancy during a time (i.e., the interval 230) from when the channel sensing interval 220 is terminated to immediately before the first OFDM symbol of a next subframe is transmitted. In other words, the base station may transmit a second signal (e.g., a PS S/S S S/CRS or newly defined signal) for channel occupancy on the unlicensed band or syncing with the UE before transmitting a first signal (e.g., a general (E)PDCCH and PDSCH) which is transmitted in the subframe (210 or 240). At this time, the second signal transmitted might not be transmitted depending on channel sensing interval termination times. Further, when the start point of occupying the channel is set from within a particular OFDM symbol, a third signal (e.g., a newly defined signal) may be transmitted up to the start time of a next OFDM symbol, and then, the second signal or first signal may be transmitted. For ease of description herein, the channel sensing operation interval is described using OFDM symbol units, but the channel sensing operation interval may be set regardless of the OFDM symbol of the LTE communication system.

Here, the second signal may be generated by re-using the primary synchronization signal (PS S)/secondary synchronization signal (SSS) used in the legacy LTE communication system or by using at least one of the PSS or SSS using a different sequence from the root sequence used on the current licensed band. Further, the second signal may be generated using a sequence other than the PSS/SSS sequence required to generate the unlicensed band base station unique value (physical cell ID (PCID)) and may be used to avoid confusion with the base station unique value. Further, the second signal may include at least one of the CRS or channel state indicator-reference signal (CSI-RS) used in the legacy LTE system or an (E)PDCCH or PDSCH or a signal modified from the signal may be used as the second signal.

Here, since the interval 230 during which the second signal is transmitted is included in the channel occupancy time, the frequency efficiency may be maximized by allowing the minimum information to be transferred through the second signal transmitted during the interval 230.

The LTE communication system using the unlicensed band as described above (hereinafter, LAA or LAA cell) requires a new-type channel access (or LBT) scheme different from the existing one using the licensed band for co-existence with other systems (hereinafter Wi-Fi communication system) using the unlicensed band and to meet the regulations posed on the unlicensed band for use.

A channel access scheme for using an unlicensed band in a Wi-Fi communication system is described below with reference to FIG. 3.

Figure 3:
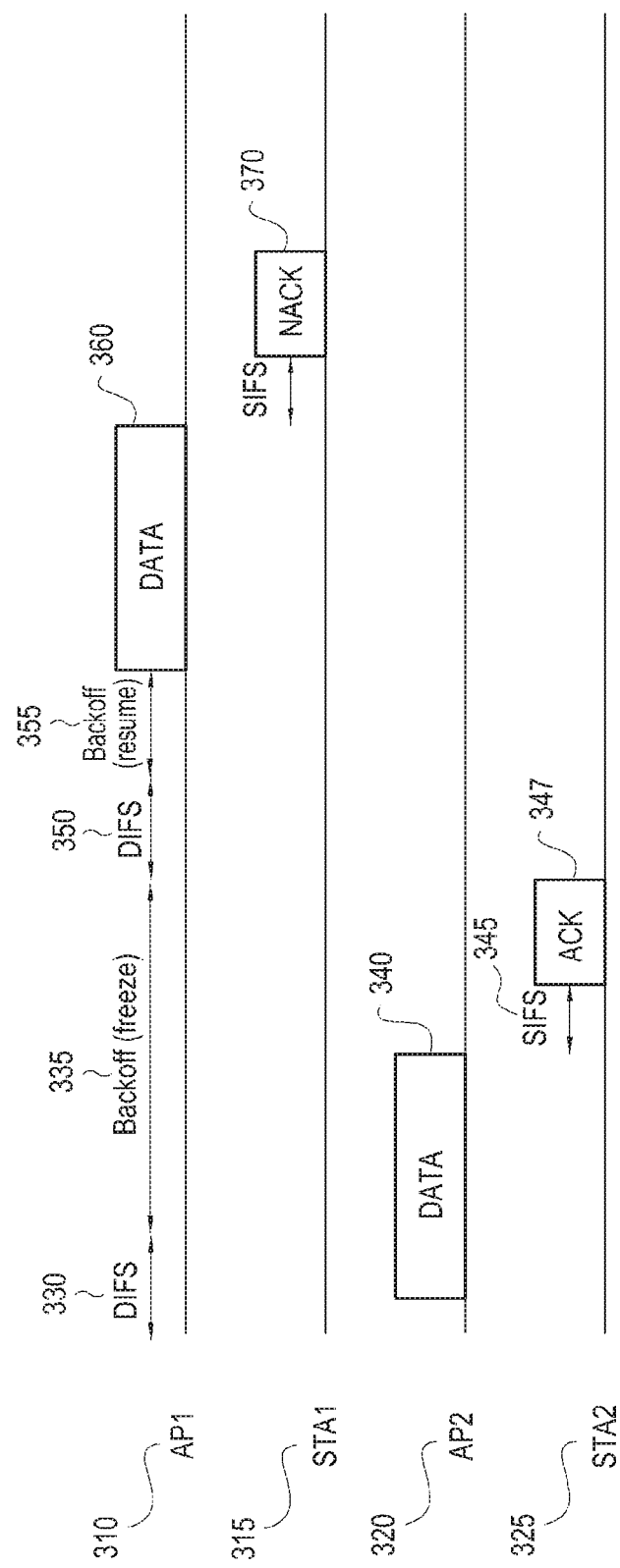
FIG. 3 illustrates a channel access scheme in a Wi-Fi communication system according to an embodiment of the present disclosure.

FIG. 3 is a view illustrating an example channel access scheme in a Wi-Fi communication system according to an embodiment of the present disclosure.

When an access point 1 (AP1) 310 has data for transmission to a station 1 (STA1) or user equipment 1 (UE 1) 315, the AP1 310 should perform a channel sensing operation for a channel to occupy the channel. Here, the channel is generally sensed during a distributed coordination function interframe space (DIFS) time 330. Whether another apparatus occupies the channel may be determined by various methods including detecting the strength of a signal received for the DIFS time 330 or a signal previously defined.

When the channel is determined to have been occupied by another apparatus 320 during the DIFS time 330, the AP1 310 selects a variable 335, e.g., N, within a preset contention window (e.g., 1 to 16). Generally, such operation is referred to as a backoff operation. Thereafter, the AP1 310 senses the channel for a time (e.g., 9 us) previously defined, and if the channel is determined to be idle, the AP1 310 deducts the selected variable N 335 by one. That is, N is updated to N−1. When the AP1 310 determines that another apparatus occupies the channel during the time, the AP1 355 freezes the variable N 335 without detection.

The STA2 325 receiving the data 340 from the AP2 320 sends, after the DIFS time 345, an acknowledge (ACK) signal 347 or negative acknowledge (NACK) signal 370 to the AP2 320 responsive to the reception of the data 340. Here, the STA2 325 may always transmit the ACK 347 or NACK signal 370 without performing a separate channel sensing operation. After the STA2 325 terminates the transmission of the ACK signal 347, the AP1 310 may be aware that the channel is idle. Here, upon determining that the channel is in the idle state during the DIFS time 350, the AP1 310 senses the channel during a predetermined time (e.g., 9 us) previously defined or set for the backoff operation, and if the channel is determined to be idle, the AP1 310 deducts the selected variable N 355 again. That is, N is updated to N−1. Here, when N=0, the AP1 310 may occupy the channel and transmit data 360 to the STA1 315. Thereafter, the STA1 315 receiving the data 360 may transfer, after the DIFS signal, an ACK signal 347 or NACK signal 370 to the AP1 310 responsive to the reception of data. Here, the AP1 310 receiving the NACK signal 370 from the STA1 315 may select a variable N for use in a next backoff operation or a resume operation 355 from within an increased contention window. That is, when the result of reception of the data 360 by the STA1 315 is the NACK signal 370, and the contention window is [1, 16], the AP 310 receiving the NACK signal 370 may have a contention window increased to [1,32]. The AP 310 receiving the ACK may have the contention window set as a default (e.g., [1,16]) or have a preset contention window reduce or remain.

According to this disclosure, the long term evolution (LTE) communication system and the LTE-A communication system are described herein as examples, but embodiments of the present disclosure may also apply to other communication systems using a licensed band and unlicensed band without limited thereto. Although carrier aggregation (CA) environments alone are assumed and described herein for ease of description according to the present disclosure, embodiments of the present disclosure are not limited thereto and may also be applicable to stand-alone environments in which operations are performed only under dual-connectivity or on unlicensed bands.

Figure 4:
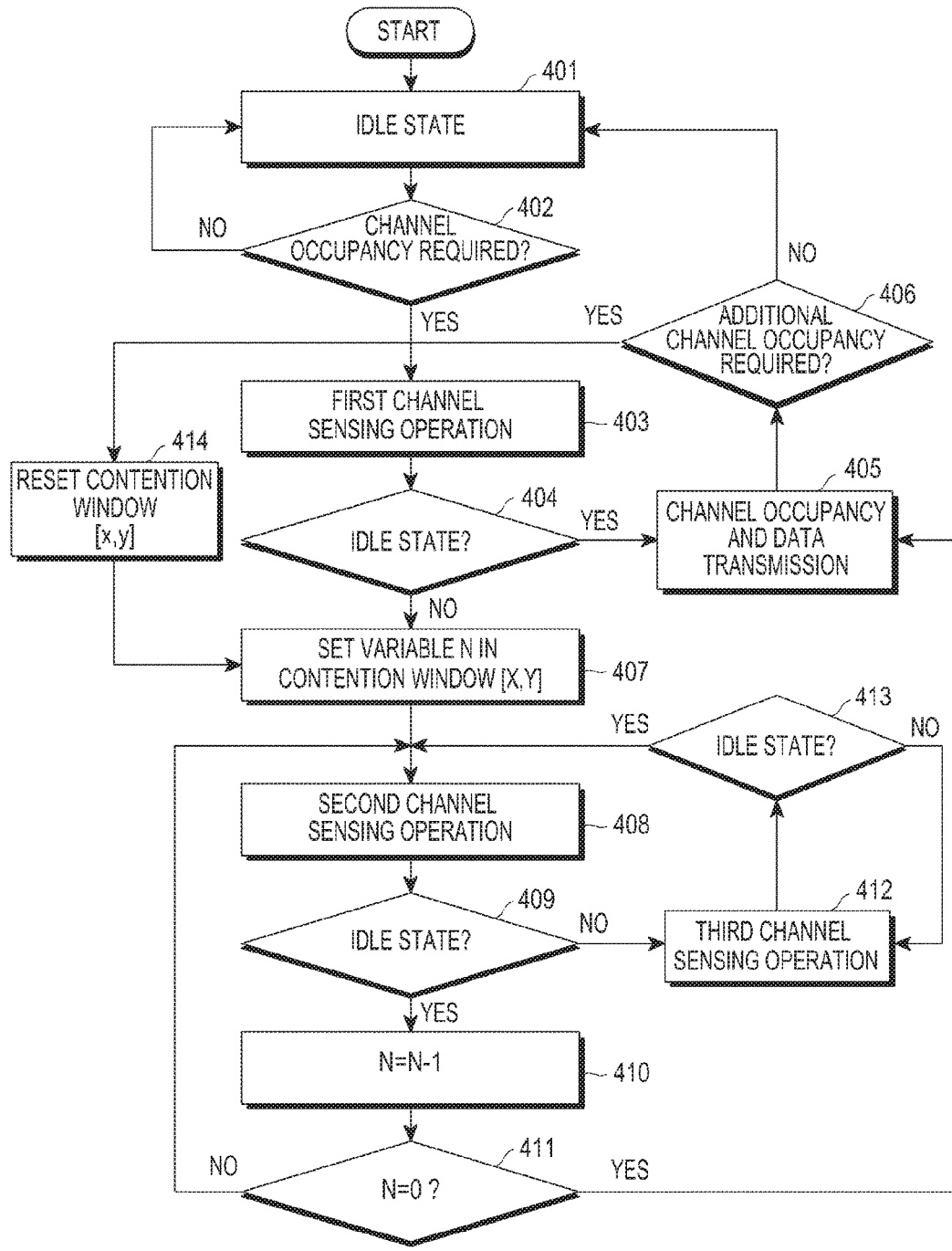
FIG. 4 illustrates a method for performing a channel sensing operation by a base station in a communication system according to an embodiment of the present disclosure.

FIG. 4 is a view illustrating an example method for performing a channel sensing operation by a base station in a communication system according to an embodiment of the present disclosure. FIG. 4 illustrates a method for sensing and occupying a channel for use of an unlicensed band in a LAA system.

Referring to FIG. 4, a base station present in a cell (i.e., a LAA cell) not requiring data transmission remains in an idle state (operation 401). Here, the idle state is a state where the base station does not transfer data signals on the unlicensed band. For example, the idle state may be a state where there is no data signal to be transferred from the base station to the UE or a state where the base station has data for transmission to the UE but waits without transmitting the data to the UE.

The base station in the idle state determines whether channel occupancy is required for transmitting at least one or more signals of data, a control signal, and a reference signal to the UE (operation 402). When the base station in the idle state needs channel occupancy, the base station performs a first channel sensing operation (operation 403). For ease of description, control signals described below encompass signals (e.g., discovery reference signal, DRS, CSI-RS, PSS, or SSS) necessary for operation between the base station and the UE including a reference signal. Here, the first channel sensing operation may be set differently by at least one condition (e.g., a priority condition for a transmission signal) of a preset time (e.g., 34 us or 25 us), a time set by another apparatus, or type of data or control signal intended to be transmitted by the base station. For example, a time for performing the first channel sensing operation for where the base station transmits only control signals, without data, to a particular UE may be set to differ from a time for performing the first channel sensing operation for where the base station sends the control signals along with data (e.g., so that transmission of control signals only performs the first channel sensing operation during a shorter time than a time for transmission of control signals and data). Here, values settable for the first channel sensing operation may be defined previously, set to have the highest priority, or set to have a higher priority than that for data signals. For example, the first channel sensing operation may be divided into intervals A and B. 'A' above may be a value (e.g., 16 us) previously defined for use in all signal transmissions. During the interval A, a channel sensing operation or no channel sensing operation may be performed. Here, although a channel sensing operation is performed during the interval A, channel occupancy or no, as determined during the interval A, might not be used for the base station's or UE's operation of determining whether the channel is occupied. The interval B may include at least one or more slots, and the length of one slot may be previously defined (e.g., 9 us). Here, different settings may be made to the interval B for where control signals only are transmitted during the channel occupancy interval and for where control signals and data signals are together transmitted. In other words, the interval B for where only control signals are transmitted during the channel occupancy interval may be set to be shorter than the interval B for where control signals and data signals are transmitted together. For example, the channel sensing interval B may be configured with one slot when only control signals are transmitted, and the channel sensing interval B may be configured with three slots when control signals and data signals are together transmitted. Further, the interval B may have different settings depending on the priority of data signals transmitted along with control signals. For example, when a data signal is transmitted requiring a minimum delay time, such as in an internet protocol-based voice (voice over internet protocol (VoIP)) service, the channel sensing interval may be configured with one slot, and when a data signal having a relatively long minimum delay time as required is transmitted such as in a file transfer protocol (FTP) service, the channel sensing interval B may be configured with three or more slots. Further, the first channel sensing operation may have different settings as to at least one or more of other variables (e.g., a threshold received signal strength for determining whether to sense a channel), but not alone the time for performing the first channel sensing operation, for where control signals alone, without data, are transmitted from the base station to a particular UE and for where data is also transmitted from the base station to the particular UE.

Here, the first channel sensing operation is an operation to determine the occupancy state of the channel by other apparatuses using various methods including at least one of detecting a signal previously defined or measuring the strength of a signal received for a time set for the first channel sensing operation. Here, the variables necessary for the first channel sensing operation including the first channel sensing time may use values previously set or may be set by other apparatuses.

The base station determines whether the unlicensed band channel is in the idle state (operation 404) after performing the first channel sensing operation. Upon determining that the unlicensed band channel is in the idle state, the base station may occupy the unlicensed band and transmit at least one or more of a control signal or data signal (operation 405). By contrast, upon determining that the unlicensed band channel is not in the idle state, the base station may perform a second channel sensing operation. Here, the base station sets a contention window used for the second channel sensing operation to a default (operation 407). That is, the base station may select any variable N from within the set contention window [x, y]. Here, an initial contention window or default may be previously defined or (re)set by the base station. Further, the contention window as set may be varied using various values including the number of times of attempting to occupy the channel, the occupancy rate (e.g., traffic load) for the channel, or the result (e.g., the number or ratio of ACK/NACK signals) of reception by the UE of the data signal transmitted upon occupying the channel. For example, when it is determined that the base station occupying the channel in operation 405 needs additional channel occupancy (operation 406), a contention window may be set in operation 414 using at least one of the above-mentioned various methods or the result of data transmission performed in operation 405. For example, when the base station sends data to the UE during the channel occupancy interval and receives a NACK signal 370 from the UE as a result of the reception of the data transmission, the base station may increase the contention window for a next channel occupancy operation or may maintain the previous contention window. When the base station occupying the channel using the contention window increased or remaining the previous contention window sends data to the UE during the channel occupancy interval and receives an ACK signal 347 from the UE as a result of the data transmission, the base station may reduce or maintain the contention window or set the contention window to the initial contention window. Here, the scheme of setting the contention window using the ACK/NACK signal is a mere example, and the contention window may be set using the above-mentioned other references.

Thereafter, when any variable N is set from within a preset contention window in operation 407, the base station may perform the second channel sensing operation using the variable N as set (408). Here, the second channel sensing operation is an operation for determining the channel occupancy state including at least one of measuring the strength of a signal received for a preset time or detecting a signal previously defined and may have a determination reference set, which is different from that of the first channel sensing operation. That is, a reference signal for the second channel sensing operation may be set to be the same as that for the first channel sensing operation or to be shorter than a time when the channel is sensed during the first channel sensing operation. For example, the first channel sensing time may be set to 34us, and the second channel sensing time may be set to 9 us. Further, a reference threshold for the second channel sensing operation used to determine whether the unlicensed band channel is in the idle state may be set to differ from a reference threshold for the first channel sensing operation.

The base station determines whether a second channel sensed is in the idle state (operation 409), and when the second channel is in the idle state, deducts the preset variable N by one (410). Here, deducting by one is merely an example, and such deduction may be performed differently depending on set values or depending on the type or nature of signals intended to be transmitted by the base station. Further, although the second channel sensed is determined to be in the idle state, the base station may abstain from deducting the set variable N by one.

The base station may determine whether the variable N deducted is 0 (operation 411), and if so, the base station may perform channel occupancy and data transmission (operation 405). In contrast, unless the variable N deducted is 0, the base station performs the second channel sensing operation again (operation 408). When the base station determines, through the second channel sensing operation, that the unlicensed band channel is in the idle state (operation 409), the base station may perform a third channel sensing operation (operation 412). Here, the third channel sensing operation may be set similarly to the first channel sensing operation or second channel sensing operation. For example, the respective times for the first channel sensing operation and the third channel sensing operation may be set to the same value, e.g., 34 us or 25 us, and the interval for the third channel sensing operation may be configured as the intervals A and B for the first channel sensing operation. Here, a reference threshold for the first channel sensing operation may be set to differ from a reference threshold for the third channel sensing operation. The reference time and threshold for the channel sensing operation are merely examples, and variables or references necessary for the third channel sensing operation may be set to be the same or different, for at least one or more, from the first channel sensing operation.

Further, the third channel sensing operation may be set to perform the operation of creating a time delay without a separate channel sensing or channel occupancy operation. Further, the third channel sensing time may be set to be the same or different from at least one of the first channel sensing time or the second channel sensing time. Using the reference value set for the third channel sensing operation, the base station determines whether other apparatuses occupy the third channel (operation 413). When the third channel is determined to be in the idle state, the base station may perform the second channel sensing operation again (operation 408). Unless the third channel is determined to be in the idle state, the base station performs the third channel sensing operation as set (operation 412).

Depending on the type or nature of data or control signal intended for transmission by the base station, at least one or more of the first channel sensing operation, the second channel sensing operation, and the third channel sensing operation may be omitted, or intervals necessary for the first channel sensing operation, the second channel sensing operation, and the third channel sensing operation may be set differently. For example, when the base station transmits only control signals (e.g., DRS), the base station may perform only the first channel sensing operation and immediately occupy the channel depending on the result of the channel sensing operation. Here, the DRS is merely an example in which at least one or more of the first channel sensing operation, the second channel sensing operation, and the third channel sensing operation may be omitted as described above, and it may also be applicable when other control signals are transmitted. The UE may also perform a channel sensing operation in the same manner as does the base station as described above with reference to FIG. 4.

There is provided a method for setting a time of performing a channel sensing operation, which is performed by a base station or UE to occupy an unlicensed band channel, so that the channel sensing operation is performed more accurately.

Now described is a channel sensing operation performed by a base station to occupy an unlicensed band channel, according to a first embodiment of the present disclosure, followed by a channel sensing operation performed by a UE to occupy an unlicensed band channel according to a second embodiment of the present disclosure.

According to the first embodiment of the present disclosure, a channel sensing operation performed by the base station to occupy an unlicensed band channel is described in greater detail, and then, a method for setting a time of performing the channel sensing operation is described. The base station attempting to occupy and use an unlicensed band may identify whether other apparatuses for the unlicensed band occupy the channel, and when the unlicensed band channel is determined to be in the idle state, the base station may occupy and use the unlicensed band. Here, the base station performs a channel sensing operation for occupying the channel during a channel sensing interval as shown in FIGS. 5A and 5B.

Figure 5A:
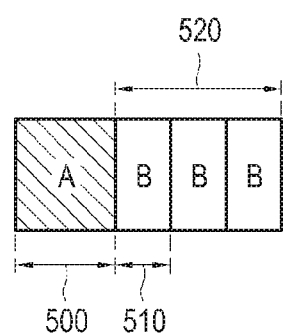
FIGS. 5A and 5B illustrate an interval where a base station performs a channel sensing operation in a communication system according to an embodiment of the present disclosure.
Figure 5B:
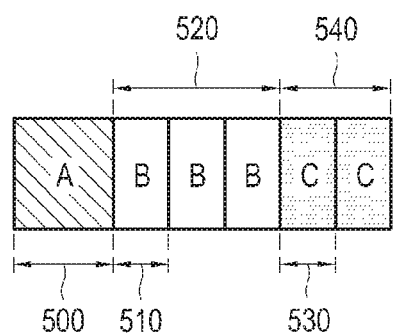

FIGS. 5A and 5B are a view illustrating an example interval where a base station performs a channel sensing operation in a communication system according to an embodiment of the present disclosure. The channel sensing operation by the base station described with reference to FIGS. 5A and 5B are merely an example of one of various channel sensing operations, and such various channel sensing operations may be applied as general channel sensing operations described herein. An example of an interval where the channel sensing operation is performed as shown in FIGS. 5A and 5B may also be intended for a UE.

The base station may perform a channel sensing operation sensing different channels depending on the type of signals intended for transmission through the unlicensed band. For example, there may be different channel sensing operations for where control signals or reference signals, without data signals, are transmitted and for where data signals are also transmitted. For example, upon transmitting a control signal or reference signal with no data signal, a channel sensing operation for the unlicensed band may be performed during an interval previously defined or set without channel sensing operation on a channel sensing interval arbitrarily selected from within a set contention window or interval set depending on the priority of transmission signal (e.g., the first channel sensing interval of FIG. 4 or the channel sensing interval A 500 and interval 510) of FIGS. 5A and 5B), and when the unlicensed band is determined to be in the idle state, the unlicensed band may be occupied and control signals or reference signals, without data signals, may be transmitted. When a transmission including a data signal is performed, an additional channel sensing operation for a channel sensing interval (e.g., the second channel sensing interval of FIG. 4, the channel sensing interval C 530 of FIG. 5B, or channel sensing intervals A (500), B (520), and C (540) of FIGS. 5A and 5B) arbitrarily selected from within the set contention window may be performed, and the signal may be transmitted through the unlicensed band channel determined to be in the idle state. The above-described channel sensing operation is described in greater detail with reference to FIGS. 5A and 5B.

A general channel sensing operation by the base station may be performed during at least one of the channel sensing intervals A (500), B (510), and C (530), and a chance of occupying the unlicensed band channel may be determined by the channel sensing operation. Here, the channel sensing operation during the channel sensing intervals A (500) and B (510) may be assumed to be the first channel sensing operation of FIG. 4, and the channel sensing operation during the channel sensing interval C (530) may be assumed to be the second channel sensing operation of FIG. 4. Further, the channel sensing intervals A (500) and B (510) may be determined depending on the priority of transmission signals or set previously, and the channel sensing interval C (520) may be arbitrarily and directly set by the base station as a value arbitrarily selected from within the set contention window. According to the first embodiment of the present disclosure, although the description is made under the assumption that the channel sensing interval C 520 is set when the base station performs transmissions including data signals, the channel sensing interval C 530 may also be set and used even when the base station transmits control signals or reference signals without data signals. Here, when the base station transmits control signals or reference signals without data signals, the channel sensing interval C 530 may be set as a minimum (e.g., one slot) and used. The channel sensing interval A 500 may be set to differ from the other channel sensing intervals B (510) and C (530). In other words, the channel sensing interval A 500 may be set to be relatively longer than the other channel sensing intervals B (510) and C (530). For example, the minimum unit of the channel sensing interval A 500 may be set to 16us, and the respective minimum units (or slot or slot length) of the channel sensing intervals B (510) and C (530) may be set to 9 us. Although the channel sensing intervals B (510) and C (530) are described to have the same minimum unit solely for description purposes, the channel sensing intervals B (510) and C (530) may be set to have different minimum units. Further, among the channel sensing intervals A, B, and C, an interval during which the channel is indeed sensed may be equal or smaller than the channel sensing intervals A, B, and C, and a time when the channel sensing operation actually starts may differ from the start times of the channel sensing intervals A, B, and C. In other words, regarding the time of initiating to actually sense the channel, the channel sensing operation may be started within a range where the channel sensing operation may be complete within the channel sensing intervals A, B, and C, considering the length of the interval where the channel is actually sensed. Here, the length of the interval where the channel is actually sensed may be defined or set in advance.

The base station may perform a channel sensing operation during at least one or more of the set channel sensing intervals A (500), B (510), and C (530), determining the state of occupying the channel by other apparatuses for the unlicensed band. Here, although a separate channel sensing operation is performed or not during the channel sensing interval A 500, the result of channel sensing determined during the channel sensing interval A 500 might not be used. In other words, the result of channel sensing determined during which the channel sensing interval A 500 may have no influence on determining a chance of occupying the channel for the unlicensed band. Further, different settings may be made to the channel sensing interval B 510 depending on the priority of signals that the base station intends to transmit using the unlicensed band. For example, the channel sensing interval B may be set to have different values for transmission of a reference signal or control signal, such as PDCCH, DRS, or CSI-RS or for transmission of PDSCH along with the signals. For example, when a PDCCH is transmitted but not is PDSCH, one channel sensing interval B 510 may be set, and when a control signal or reference signal, as well as a PDSCH, is transmitted, three channel sensing intervals B 520 may be set. Here, the channel sensing intervals B 520 for where the PDSCH is transmitted together may have different settings depending on the priority of the PDSCH. For example, when VoIP data is transmitted through the PDSCH, less than three channel sensing intervals B may be set, and when FTP data is transmitted through the PDSCH, three or more channel sensing intervals B may be set. Further, even when a control signal or reference signal, such as PDCCH, DRS, or CSI-RS, is transmitted but PDSCH is not, different numbers of channel sensing intervals B may be used depending on the type of the control signal or reference signal that is intended for transmission through the unlicensed band.

When the base station attempts to send a transmission including PDSCH through the unlicensed band, the base station may be configured to additionally sense the channel during the channel sensing interval C 540 subsequent to the channel sensing intervals A (500) and B (520). Here, the channel sensing interval C 540 may be determined by a value arbitrarily selected from within a set contention window, and different settings may be made to the size of the contention window depending on the priority of data that is included and transmitted through the PDSCH.

For where the base station attempts to send a control signal or reference signal without PDSCH through the unlicensed band, channel sensing intervals may include the channel sensing intervals A (500) and B (520) as shown in FIG. 5A. In other words, the channel sensing interval (the A+B+B+B interval in FIG. 5A or interval denoted '625' in FIG. 6A) minimally required where the base station attempts to send a control signal or reference signal without PDSCH through the unlicensed band is previously set, and thus, it may be known before the channel sensing operation starts. Thus, when the base station attempts to send a control signal or reference signal without PDSCH through the unlicensed band at a particular time (e.g., subframe T), the start time that the base station performs the channel sensing operation may be set based on at least one of a first to third method as follows. The first method is to set the base station to start a channel sensing operation before the channel sensing interval minimally required for signal transmission from the signal transmission start time T when the base station transmits a signal. The second method is to set the base station to start a channel sensing operation at an OFDM symbol including the start time of the channel sensing interval minimally required for signal transmission from the signal transmission start time T when the base station transmits a signal. Here, the second method may also include starting a channel sensing operation from a previous symbol to the OFDM symbol including the start time of the channel sensing interval minimally required for signal transmission from the signal transmission start time T when the base station transmits a signal. The third method is to set the base station to start a channel sensing operation at any OFDM symbol before the channel sensing interval minimally required for signal transmission from the signal transmission start time T when the base station transmits a signal.

A method for setting a start time when a base station performs a channel sensing operation is described in greater detail with reference to FIGS. 6A and 6B.

FIGS. 6A and 6B are a view illustrating example start times when a base station performs a channel sensing operation in a communication system according to an embodiment of the present disclosure. A method for setting a start time when the base station performs a channel sensing operation is described more specifically with reference to FIGS. 6A and 6B. Here, for a channel sensing operation by the base station, no signal may be transmitted through at least one symbol of the last subframe of the downlink transmission time of the base station.

First, when the base station attempts to transmit a control signal or reference signal without PDSCH through the unlicensed band through an OFDM symbol or subframe T, a channel sensing interval A 615 and three channel sensing intervals B 620 are assumed to be set as ones required for the base station. Here, setting three channel sensing intervals B 620 is merely an example, and one or more channel sensing intervals B may be configured.

A first method for setting a start time when the base station performs a channel sensing operation is described using an example shown in FIG. 6A(1). The base station needs a channel sensing operation for the unlicensed band for signal transmission at the signal transmission start time T 610. Thus, the base station may set a time immediately before the channel sensing interval 625 minimally set from the start time 610 when the downlink signal is transmitted as the time (e.g., T-(A+B+B+B)time) when the channel sensing operation starts. Here, although the base station excludes the time (e.g., X us) minimally required by hardware or software for supporting an operation for setting the start time, as well as a time required to convert the channel sensing operation into a signal transmission operation, a time (e.g., T-(A+B+B+B+X)) minimally required for the system operation may be added to set the start time of performing the channel sensing operation. An operation for adding the time X us minimally required for the system operation has been described in connection with the above example, but this may also be applicable to the overall disclosure. FIG. 6A(s) shows the base station performing a channel sensing operation of B+B which is equal to the 630 interval.

A second method for setting a start time when the base station performs a channel sensing operation using an example shown in FIG. 6A(3) is described. The base station may set a time of starting the channel sensing operation so that the channel sensing operation may be performed from the OFDM symbol 605 including the start time of the channel sensing interval (A+B+B+B) minimally required for downlink signal transmission at the signal transmission start time T 610. The second method allows the channel sensing operation to start with respect to an OFDM symbol unit in a communication system operated in OFDM symbol units, reducing the complexity in implementing the base station. However, when the minimally required channel sensing interval as set above is shorter than the length of one OFDM symbol as shown in FIG. 6A(3), no separate channel sensing operation may be performed during an idle interval 635 from the end time of the channel sensing operation until immediately before the downlink signal transmission. Or, the base station may send an existing downlink signal defined for channel occupancy or newly define a separate signal D during the idle interval 635 and transmit the signal D until immediately before the interval 610 during which the downlink signal is transmitted, thereby occupying the unlicensed band. Here, the channel sensing operation B or C may be additionally performed during the idle interval 635. When the base station additionally performs the channel sensing operation B or C during the idle interval 635, the result of channel sensing determined during the idle interval 635 may not influence the determination of a chance for the base station to actually occupy the unlicensed band channel. Thus, when a channel sensing operation is performed using the channel sensing operation B or C during the idle interval 635, the result of performing the channel sensing operation B or C during the idle interval 635 may not be used to determine a chance for the base station to actually occupy the channel for the unlicensed band (or determine whether other apparatuses occupy the channel). Further, when the base station lacks a capability of transmitting the separate signal D newly defined or existing downlink signal defined for channel occupancy during the idle interval 635, the base station may not perform a channel sensing operation during the idle interval 635 or set the time of starting the channel sensing operation based on the signal transmission time as shown in examples shown in FIG. 6A(1) and (2).

Here, the channel sensing operation during the channel sensing interval A may be performed using one or more channel sensing intervals B. For example, as shown in FIG. 6A(2) and (4), when the channel sensing interval A is 16 us, and the minimum unit of the channel sensing interval B is 9 us, the channel sensing operation during the channel sensing interval A may be replaced with one performed during two channel sensing intervals B. From this, the base station may perform a channel sensing operation during one channel sensing interval (e.g., the channel sensing interval B or C), but not performing a channel sensing operation during different channel sensing intervals, such as channel sensing intervals A and B. Here, the base station may not perform a separate channel sensing operation during the time corresponding to the channel sensing interval A, or even when performing a separate channel sensing operation, may not use the result of channel sensing determined during the channel sensing interval A. In other words, the result of channel sensing determined during the channel sensing interval A may not be used to determine a chance for the base station to actually occupy the channel for the unlicensed band. Thus, even when the channel sensing operation is performed using the channel sensing operation B for the channel sensing interval A, the result of performing the channel sensing operation B for the channel sensing interval A may not be used to determine a chance for the base station to occupy the channel for the unlicensed band.

The base station may perform an additional channel sensing operation using the channel sensing operation C 640 during the idle interval 635 using the example shown in FIG. 6A(5). Here, the channel sensing operation B and the channel sensing operation C are assumed to perform the same channel sensing operation. When the channel sensing operation C 640 is additionally performed during the idle interval 635, the result of performing the channel sensing operation during the channel sensing operation C 640 may not be used to determine a chance for the base station to actually occupy the channel for the unlicensed band. When the result of performing the additional channel sensing operation during the channel sensing operation C 640 is used to determine a chance for the base station to occupy the channel for the unlicensed band, if the base station determines through the additional channel sensing operation C that the unlicensed band channel is in the idle state, the additional channel sensing operation C may last up to a downlink signal transmission time. Unless the unlicensed band channel in the additional channel sensing operation C 640 is in the idle state, i.e., when it is determined that another apparatus occupies the unlicensed band, the base station may stop the additional channel sensing operation C and perform a new channel sensing operation A or B.

The third method for setting a start time for the base station to perform a channel sensing operation may allow a channel sensing operation to start at any OFDM symbol among OFDM symbols including the channel sensing interval (A+B+B) time minimally required for signal transmission from the start time T when a signal is transmitted, thereby increasing the chance of channel occupancy. For example, an operation of sensing the channel for the unlicensed band may last from any OFDM symbol (e.g., two OFDM symbols before the start time) before the OFDM symbol 605. Here, after the start time of the minimally required channel sensing interval, the base station may steadily perform the channel sensing operation B or C until immediately before the signal transmission or transmit an existing signal defined or a separate signal D to occupy the channel until immediately before the signal transmission.

When the base station attempts to transmit along with a PDSCH through the unlicensed band, channel sensing intervals A, B, and C may be configured as shown in FIG. 5B and FIG. 6B. Here, the minimally required channel sensing interval C may be set by a value arbitrarily selected from within a set contention window, and as the minimally required channel sensing interval C, a different value may be arbitrarily selected whenever the base station performs a channel sensing operation to occupy the channel. Further, the channel sensing operation C and the channel sensing operation B may be operated in the same manner for convenience of implementation. In other words, the channel sensing interval 655 minimally required when the base station attempts to send a downlink signal containing PDSCH through the unlicensed band may include the time 655 containing the channel sensing interval C 650 arbitrarily selected from within the set contention window and the channel sensing intervals A (610) and B (620) previously defined or fixedly set depending on the priority for transmission signals.

Since the channel sensing interval (the interval 655 or the A+B+B+B+C+C interval in the case of FIGS. 6A and 6B) minimally required when the base station attempts to send a downlink signal containing PDSCH through the unlicensed band channel is previously set, it may be known before setting the start time when the channel sensing operation is performed. Thus, the base station may set the start time of performing the channel sensing operation using at least one of the first, second, and third methods for setting a start time as described above. Here, the first, second, and third methods for setting a start time have already been described above, and no further description thereof is given. The base station may perform the channel sensing operation during the channel sensing interval minimally required upon transmission of the downlink signal containing PDSCH, such as during the intervals 670 and 660 and 680 using the example in FIG. 6B(4) and (5), thereby transmitting a signal (e.g., Rel-12 PSS/SSS/CRS) defined in the legacy system or a newly defined signal D or performing an additional channel sensing operation C from the time when the channel for the unlicensed band is determined to be in the idle state until the time (e.g., a subframe boundary or time transmittable as previously defined) when the downlink signal containing PDSCH is transmittable. Here, although the channel for the unlicensed band is determined to be in the idle state during the interval 670 or 680 when the base station additionally performs the channel sensing operation C, the variable N set in operation 410 of FIG. 4 might not be deducted. Here, when the channel for the unlicensed band is determined to be in the idle state during the interval 670 or 680 when the base station additionally performs the channel sensing operation C, the variable N set in operation 410 of FIG. 4 may be deducted. Further, the base station may additionally perform the channel sensing operation (670 or 680) when the variable N set in operation 410 of FIG. 4 becomes 0. Further, although the variable N set in operation 410 of FIG. 4 does not become 0 (650), the base station may additionally perform the channel sensing operation C (670 or 680), and even when the channel for the unlicensed band is determined to be in the idle state, the base station may or may not deduct the variable N set in operation 410 of FIG. 4.

A channel sensing operation performed by a base station to occupy an unlicensed band channel, according to the first embodiment of the present disclosure, has been described. Now described is a channel sensing operation performed by a UE to occupy an unlicensed band channel according to a second embodiment of the present disclosure.

According to the second embodiment of the present disclosure, a channel sensing operation performed by the UE to occupy an unlicensed band channel is described in greater detail, and then, a method for setting a time of performing the channel sensing operation is described. The UE attempting to occupy and use an unlicensed band may identify whether other apparatuses for the unlicensed band occupy the channel, and when the unlicensed band channel is determined to be in the idle state, the UE may occupy and use the unlicensed band. Here, the UE performs a channel sensing operation for occupying the channel during a channel sensing interval as shown in FIGS. 5A and 5B.

The channel sensing operation by the UE described with reference to FIGS. 5A and 5B are merely an example of one of various channel sensing operations, and such various channel sensing operations may be applied as general channel sensing operations described herein.

The UE may perform a channel sensing operation sensing different channels depending on the type of signals intended for transmission through the unlicensed band. For example, there may be different channel sensing operations for where control signals, reference signals, or feedback information (ACK/NACK signal or CSI), without data signals, are transmitted and for where data signals are also transmitted. For example, upon transmitting a control signal or reference signal with no data signal, a channel sensing operation for the unlicensed band may be performed during an interval previously defined or set without channel sensing operation on a channel sensing interval arbitrarily selected from within a set contention window or interval set depending on the priority of transmission signal (e.g., the first channel sensing interval of FIG. 4 or the channel sensing intervals A (500) and B (510) of FIGS. 5A and 5B), and the signal may be transmitted through the unlicensed band channel determined to be an idle channel. When a transmission including a data signal is performed, an additional channel sensing operation for a channel sensing interval (e.g., the second channel sensing interval of FIG. 4, the channel sensing interval C 530 of FIG. 5B) arbitrarily selected from within the set contention window may be performed, and the signal may be transmitted through the unlicensed band channel determined to be in the idle state. Here, the UE may receive the necessary channel sensing interval from the base station instead of arbitrarily selecting the necessary channel sensing interval from within the set contention window. The above-described channel sensing operation is described in greater detail with reference to FIG. 7.

Figure 7:
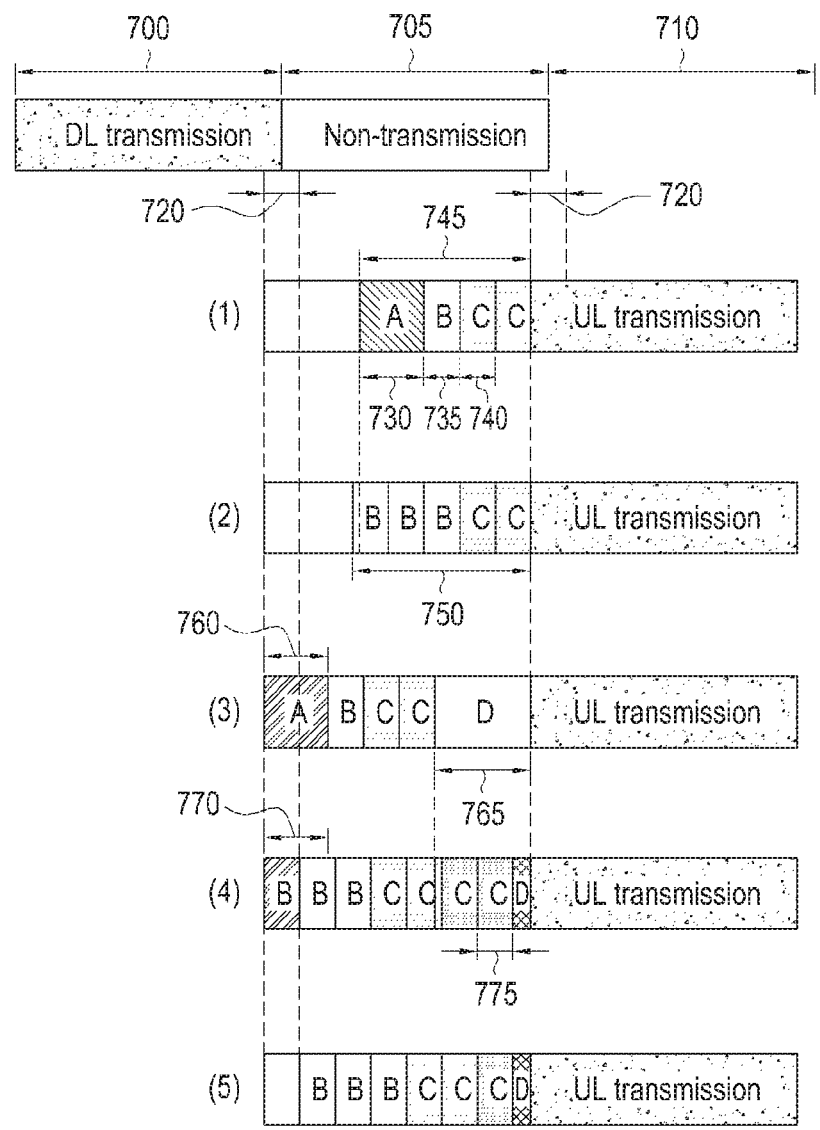
FIG. 7 illustrates an interval where a UE performs a channel sensing operation in a communication system according to an embodiment of the present disclosure.

FIG. 7 is a view illustrating an example interval where a UE performs a channel sensing operation in a communication system according to an embodiment of the present disclosure.

A general channel sensing operation by the UE may be performed during at least one of the channel sensing intervals A (730), B (735), and C (740), and a chance of occupying the unlicensed band channel may be determined by the channel sensing operation. Here, the channel sensing operation during the channel sensing intervals A (730) and B (735) may be assumed to be the first channel sensing operation of FIG. 4, and the channel sensing operation during the channel sensing interval C (740) may be assumed to be the second channel sensing operation of FIG. 4. Further, the channel sensing intervals A (730) and B (735) may be determined depending on the priority of transmission signals or set previously, and the channel sensing interval C (740) may be arbitrarily and directly set by the base station as a value arbitrarily selected from within the set contention window. The base station may select the channel sensing interval C and transfer information regarding the selected channel sensing interval C.

As per the second embodiment of the present disclosure, the description is made under the assumption that the channel sensing interval C 740 is set when the UE performs a transmission containing a data signal (e.g., PUSCH). However, even when the UE performs a transmission containing a data signal, the channel sensing interval C may not be set, or even set, the channel sensing interval C may be set as a fixed interval. Here, the channel sensing interval A 730 may be set to differ from the other channel sensing intervals B (735) and C (740). In other words, the channel sensing interval A 730 may be set to be relatively longer than the other channel sensing intervals B (735) and C (740). For example, the minimum unit of the channel sensing interval A 730 may be set to 16us, and the respective minimum units of the channel sensing intervals B (735) and C (740) may be set to 9us. Although the channel sensing intervals B (735) and C (740) are described to have the same minimum unit and to be thus the same channel sensing interval solely for description purposes, the channel sensing intervals B (735) and C (740) may be set to have different minimum units. Further, among the channel sensing intervals A, B, and C, an interval during which the channel is indeed sensed may be equal or smaller than the channel sensing intervals A, B, and C, and a time when the channel sensing operation actually starts may differ from the start times of the channel sensing intervals A, B, and C. In other words, regarding the time of initiating to actually sense the channel, the channel sensing operation may be started within a range where the channel sensing operation may be complete within the channel sensing intervals A, B, and C, considering the length of the interval where the channel is actually sensed. Here, the length of the interval where the channel is actually sensed may be defined or set in advance.

Due to a propagation delay, the UE generally receives a downlink signal from the base station, a predetermined propagation delay time after the base station sends the downlink signal. Further, the base station receives an uplink signal from the UE a predetermined propagation delay time after the UE transmits the uplink signal. Accordingly, to address problems that occur on the receive (Rx) end due to such propagation delay, LTE has adopted timing advanced (TA) 720. The base station measures information about the delay time between the base station and the UE and transfers TA information (or information about the delay time) to the UE. Based on the previous transmission time, the UE may make an uplink transmission as early as the transmission time set by the base station. In other words, the UE transmits an uplink signal, the TA 720 set by the base station before the downlink reception time. Here, since the uplink from the UE is received by the base station after the propagation delay time (TA/2) between base station and UE, the base station and the UE may receive the uplink/downlink signals at exact times.

The UE, after receiving scheduling information about uplink transmission from the base station, may send an uplink signal. Generally, when using a time relation regarding frequency division duplexing (FDD), the UE may receive uplink scheduling information of subframe T from the base station at subframe T-4. For ease of description herein, the description is made under the assumption of the FDD scheduling time relation between base station and UE. However, time division duplexing (TDD) or a newly defined scheduling time relation between base station and UE may also be assumed.

In other words, the UE having received the uplink scheduling information from the base station at subframe T-4 as described above should perform a channel sensing operation before the subframe T (710) time in order to transmit, e.g., an uplink signal through he unlicensed band at subframe T 710. Here, the start time when the UE performs a channel sensing operation may be set based on at least one of the first to third methods. Here, although the UE is assumed to be set by the base station to initiate uplink transmission at subframe T for ease of description, what has been described in connection with the instant embodiment may also apply even where a particular time point (e.g., the start time of the second transmission symbol of subframe T or Z us after the start time of the first symbol of subframe T) is set as the start time of uplink transmission, not alone where subframe T is set as the start time of uplink transmission. A first method is to set the UE to start a channel sensing operation before a channel sensing interval minimally required for signal transmission from the signal transmission start time T when the UE sends a signal. A second method is to set the UE to start a channel sensing operation at a single carrier-frequency division multiple access (SC-FDMA) symbol containing a start time of the channel sensing interval minimally required for signal transmission from the signal transmission start time T when the UE sends a signal. Here, as per the second method, the UE may start a channel sensing operation at a symbol prior to the SC-FDMA symbol containing the start time of the channel sensing interval minimally required for signal transmission from the signal transmission start time T when the UE sends a signal. A third method is to set the UE to start a channel sensing operation at any SC-FDMA symbol before the channel sensing interval minimally required for signal transmission from the signal transmission start time T when the UE transmits a signal.

A method for setting a start time when a UE performs a channel sensing operation is described in greater detail with reference to FIG. 7. Here, the downlink transmission time of the base station may be 700 or no signal may be transmitted during a partial interval 705 of the downlink transmission time of the base station (or at a time predicted for the UE to perform a channel sensing operation) for the channel sensing operation by the UE.

First, when the UE attempts to send an uplink signal through the unlicensed band channel at subframe T or SC-FDMA symbol (or OFDM symbol), channel sensing interval A 730, one channel sensing interval B 735, and two channel sensing intervals C 740 are assumed to be set as channel sensing intervals necessary to the UE. Here, setting one channel sensing interval B 735 is merely an example, and one or more channel sensing intervals B may be configured.

A first method for setting a start time when the UE performs a channel sensing operation is described using an example shown in FIG. 7(1). The UE, having received uplink scheduling information from the base station at subframe T-4, needs a channel sensing operation for the unlicensed band for signal transmission at the signal transmission start time T 710. Thus, the UE may set a start time (e.g., a T-(A+B+C+C) time) of the channel sensing operation to be able to perform the channel sensing operation for uplink signal transmission immediately before the channel sensing interval 745 set as the channel sensing interval minimally required from the start time 710 when the uplink signal is transmitted. Here, although the UE excludes the time (e.g., X us) minimally required by hardware or software for supporting an operation for setting the start time, as well as a time required to convert the channel sensing operation into a signal transmission operation, the minimally required time (e.g., T-(A+B+C+C+X)) may be added to set the start time of performing the channel sensing operation. An operation for adding the time X us minimally required for the system operation has been described in connection with the above example, but this may also be applicable to the overall disclosure. As shown in FIG. 7(2), sensing interval (B+B+B+C+C) is the minimally required time 750.

A second method for setting a start time when the UE performs a channel sensing operation using an example shown in FIG. 7(3) is described. The UE may set a time of starting the channel sensing operation so that the channel sensing operation may be performed from the SC-FDMA symbol 705 including the start time of the channel sensing interval (A+B+C+C) minimally required for uplink signal transmission at the signal transmission start time T 710. The second method allows the channel sensing operation to start with respect to an SC-FDMA symbol unit in a communication system operated in SC-FDMA symbol units, reducing the complexity in implementing the UE. However, when the minimally required channel sensing interval as set above is shorter than the length of one SC-FDMA symbol as shown in FIG. 7(3), an idle interval 765 happens to remain from the end time of the channel sensing operation until immediately before the uplink signal transmission. Here, the UE may abstain from performing a separate channel sensing operation during the idle interval 765. Or, the UE may send an existing uplink signal defined or define and send a new signal D during the idle interval 765 until immediately before sending the uplink signal 710, thereby occupying the unlicensed band. Here, when the UE lacks a capability of transmitting the separate signal D newly defined or existing uplink signal defined for channel occupancy during the idle interval 765, the UE may not perform a channel sensing operation during the idle interval 765 or set the time of starting the channel sensing operation based on the signal transmission time as shown in examples shown in FIGS. 7(1) and (2).

Here, the UE may additionally perform a channel sensing operation B or C as shown in FIGS. 7(4) and (5) during the idle interval 765. When the UE performs the channel sensing operation B or C during the idle interval 765, the result of channel sensing determined during the idle interval 765 may not be used for the UE to determine whether another apparatus occupies the channel for the unlicensed band.

Here, the channel sensing operation during the channel sensing interval A may be performed using one or more channel sensing intervals B. For example, as shown in FIGS. 7(2), (4), and (5), when the channel sensing interval A is 16us, and the minimum unit of the channel sensing interval B is 9us, the channel sensing operation during the channel sensing interval A may be replaced with one performed during two channel sensing intervals B. From this, the UE may perform a channel sensing operation during one channel sensing interval (e.g., the channel sensing interval B or C), but not performing a channel sensing operation during different channel sensing intervals, such as channel sensing intervals A and B. Here, the UE may not perform a separate channel sensing operation during the time corresponding to the channel sensing interval A, or even when performing a separate channel sensing operation, may not use the result of channel sensing determined during the channel sensing interval A. In other words, the result of channel sensing determined during the channel sensing interval A may not be used to determine a chance for the UE to actually occupy the channel for the unlicensed band. Thus, even when the channel sensing operation is performed using the channel sensing operation B for the channel sensing interval A, the result of performing the channel sensing operation B for the channel sensing interval A may not be used to determine a chance for the UE to occupy the channel for the unlicensed band. Therefore, when the UE starts to perform a channel sensing operation at the uplink transmission time which is set based on the TA set by the base station, a self-interference signal (interference by the base station), which occurs because the uplink transmission time is set based on the TA of the UE, may unnecessarily be measured during some intervals 760 and 770 of the channel sensing interval as shown in FIGS. 7(3) and (4). In such a case, the UE may receive a downlink signal from the servicing base station during the channel sensing interval, ending up determining that the channel is not in the idle state. Thus, when the channel sensing operation is performed from the SC-FDMA symbol start time, and the start time of the channel sensing operation is the uplink transmission time set based on the TA as described above, the result of performing the channel sensing operation during the first channel sensing interval of the channel sensing interval A or channel sensing interval B may be rendered not to influence determination as to a chance for the UE to actually occupy the unlicensed band channel. Here, the above problems may be addressed by preventing the result of channel sensing determined during the channel sensing interval A from use in determining a chance for the UE to occupy the unlicensed band channel. Another method may be to set the start time of a channel sensing operation based not upon the uplink transmission time set based on the TA but upon a downlink transmission time, as shown in FIG. 7(5). In other words, the UE may set the uplink transmission time considering the TA and may set the start time of a channel sensing operation without considering the TA or depending on the downlink transmission time.

Further, the UE may additionally perform a channel sensing operation C for the unlicensed band until a startable time when an uplink signal is transmitted (e.g., a subframe boundary or time transmittable as defined previously), such as an interval 775 of FIGS. 7(4) and (5). Here, although the channel for the unlicensed band is determined to be in the idle state during the interval 775 when the UE additionally performs the channel sensing operation C, the variable N set for setting a channel sensing interval as in operation 410 of FIG. 4 might not be deducted or may remain 0. Here, the UE may additionally perform the channel sensing operation C when the variable N set in operation 410 of FIG. 4 becomes 0. Further, although the variable N does not become 0, the UE may additionally perform the channel sensing operation C and may perform the channel sensing operation C within an additional channel sensing interval 775 to deduct the variable N by one depending on whether the channel is in the idle state. Here, when the UE additionally performs the channel sensing operation C during the interval 775, the result of channel sensing determined during the idle interval 775 may not be used for the UE to determine whether another apparatus occupies the channel for the unlicensed band.

Further, as per the instant embodiment, the start time of the channel sensing operation may be set considering at least one or more of power necessary for the UE to perform the channel sensing operation, power necessary to transmit a channel occupancy signal, and power currently available to the UE. For example, when the UE has sufficient available power, the UE may perform a channel sensing operation, taking, as the channel occupancy start time, the uplink signal transmission time or a time earlier than the start time set according to the above embodiment. When the UE has insufficient available power, the UE may set a start time of a channel sensing operation using a method as shown in FIGS. 7(1) and (2) in order to minimize the channel sensing operation.

A channel sensing operation performed by a UE to occupy an unlicensed band channel, according to the first embodiment of the present disclosure has been described. Now described is a flow of the channel sensing operations performed by the base station and UE described above according to the first and second embodiments.

Figure 8:
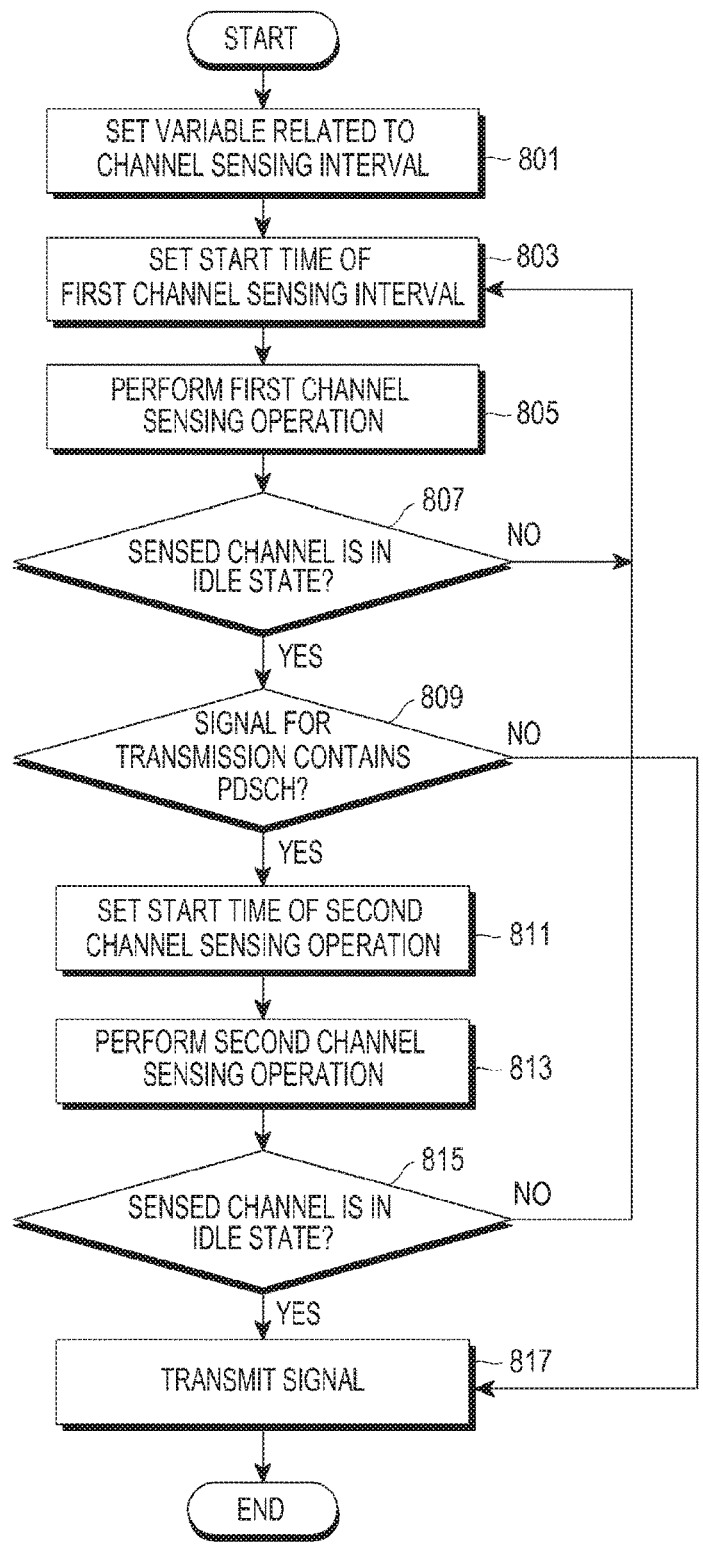
FIG. 8 illustrates a method for performing a channel sensing operation by a base station in a communication system according to an embodiment of the present disclosure.

FIG. 8 is a view illustrating a method for performing a channel sensing operation by a base station in a communication system according to an embodiment of the present disclosure.

Referring to FIG. 8, the base station sets variables related to a channel sensing interval for performing a channel sensing operation (operation 801). Here, the variables may be set based on Equation 1 above or regulations (e.g., ETSI BRAN, EN301 893) defined per country where the system is used or for frequency bands. At least one or more of the variables may be set to differ from a variable applied to a previous channel sensing operation, previously defined between base station and UE, set for the UE by the base station through a higher level signal, or set to differ depending on transmission/reception results of data transmitted through an unlicensed band.

The base station sets a start time of performing a first channel sensing operation based on the set variables (operation 803). Here, the first channel sensing operation is to sensing a channel for transmitting only control signals with no data. Specifically, the base station sets the start time of performing the first channel sensing operation using at least one of the first to third methods set forth below. That is, the first method is to set the base station to start a channel sensing operation before the channel sensing interval minimally required for signal transmission from the signal transmission start time T when the base station transmits a signal. The second method is to set the base station to start a channel sensing operation at an OFDM symbol including the start time of the channel sensing interval minimally required for signal transmission from the signal transmission start time T when the base station transmits a signal. The third method is to set the base station to start a channel sensing operation at any OFDM symbol before the channel sensing interval minimally required for signal transmission from the signal transmission start time T when the base station transmits a signal. Here, specific embodiments for the first to third methods have been described above with reference to FIGS. 5 and 6, and thus, no further detailed description thereof is provided.

Thereafter, the base station performs the first channel sensing operation from the set start time (operation 805). The base station determines whether a channel sensed as the result of performing the first channel sensing operation is in the idle state (807). Unless the sensed channel is in the idle state, the base station returns to operation 803 and sets a start time to perform the first channel sensing operation.

In contrast, when the sensed channel is in the idle state, the base station determines whether a signal to be transmitted contains a PDSCH (operation 809). Unless the signal to be transmitted contains a PDSCH, the base station sends the signal through the channel sensed by the first channel sensing operation (operation 807). When the signal to be transmitted contains a PDSCH, the base station sets a start time for performing a second channel sensing operation (operation 811). Here, the base station, upon setting the start time for performing the second channel sensing operation, uses at least one of the first to third methods for setting a start time as described above.

The base station performs the second channel sensing operation at the start time set to perform the second channel sensing operation (operation 813). Thereafter, the base station determines whether the sensed channel is in the idle state (operation 815), and if in the idle state, sends the signal containing the PDSCH through the channel sensed by the second channel sensing operation (operation 817). In contrast, unless the sensed channel is in the idle state, the base station turns back to operation 803 and sets a start time to perform the first channel sensing operation.

Thus, the base station may be configured to sense a channel at different start times depending on whether the signal to be transmitted contains a data signal. The base station may enhance the capability for a channel sensing operation on the unlicensed band by clearly defining references for setting a start time to perform the channel sensing operation.

Figure 9:
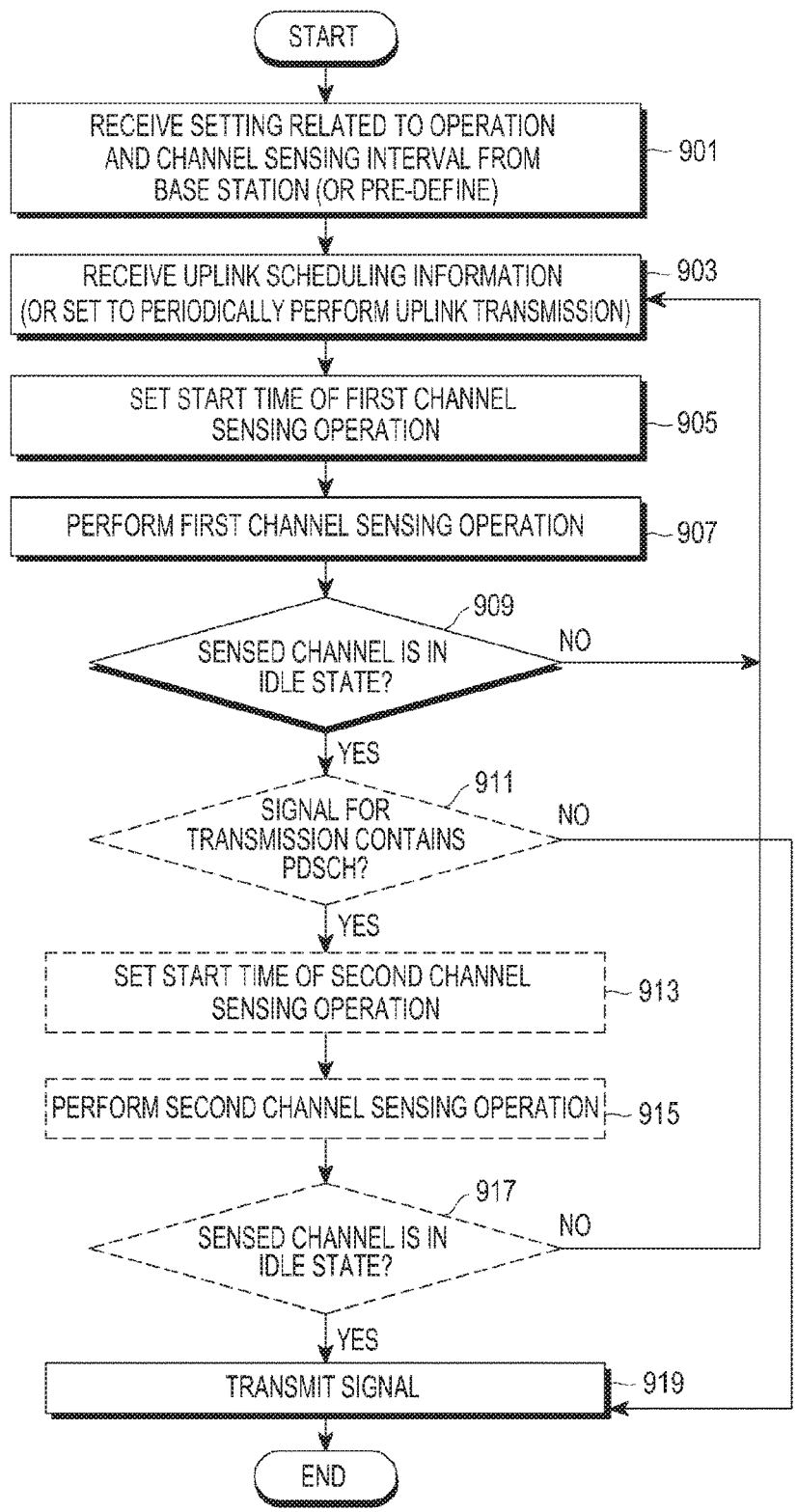
FIG. 9 illustrates a method for performing a channel sensing operation by a UE according to an embodiment of the present disclosure.

FIG. 9 is a view illustrating a method for performing a channel sensing operation by a UE according to an embodiment of the present disclosure.

Referring to FIG. 9, the UE receives variables related to a channel sensing interval to perform a channel sensing operation from the base station (operation 901). Here, the variables may be previously defined between the base station and the UE. The UE receives scheduling information about uplink transmission for signal transmission from the base station (operation 903). Generally, when using a time relation regarding FDD, the UE may receive uplink scheduling information of subframe T from the base station at subframe T-4. Or, the UE may be configured to periodically send an uplink signal.

The UE sets a start time of performing a first channel sensing operation based on the received variables (operation 905). Here, the first channel sensing operation is to sensing a channel for transmitting only control signals with no data. Specifically, the UE sets the start time of performing the first channel sensing operation using at least one of the first to third methods set forth below. That is, the first method is to set the UE to start a channel sensing operation before the channel sensing interval minimally required for signal transmission from the signal transmission start time T when the base station transmits a signal. The second method is to set the UE to start a channel sensing operation at an SC-FDMA symbol including the start time of the channel sensing interval minimally required for signal transmission from the signal transmission start time T when the base station transmits a signal. A third method is to set the UE to start a channel sensing operation at any SC-FDMA symbol before the channel sensing interval minimally required for signal transmission from the signal transmission start time T when the UE transmits a signal. Here, specific embodiments for the first to third methods have been described above with reference to FIGS. 5 and 7, and thus, no further detailed description thereof is provided.

Thereafter, the UE performs the first channel sensing operation from the set start time (operation 907). The UE determines whether a channel sensed as the result of performing the first channel sensing operation is in the idle state (operation 909). When the sensed channel is in the idle state, the UE determines whether a signal to be transmitted contains a PUSCH (operation 911). Unless the sensed channel is in the idle state, the UE goes back to operation 903 to receive scheduling information for uplink transmission for signal transmission from the base station. Meanwhile, upon determining that the channel sensed in operation 909 is in the idle state, the UE may skip the operation of determining whether the signal to be transmitted contains a PUSCH depending on settings to the UE or communication system. In other words, when the UE determines that the channel sensed by the first channel sensing operation is in the idle state, the UE, in operation 919, may send a signal, which is intended to be done so through the channel sensed by the first channel sensing operation, regardless of whether the signal to be transmitted contains a PUCCH. Accordingly, operations 911 to 917 set forth below may be selective performed or may not be performed depending on settings to the UE or communication system.

Unless the signal to be transmitted contains a PUSCH, the UE sends the signal through the channel sensed by the first channel sensing operation (919). In contrast, when the signal to be transmitted contains a PUSCH, the UE sets a start time for performing a second channel sensing operation (operation 913). Here, the UE, upon setting the start time for performing the second channel sensing operation, uses at least one of the first to third methods for setting a start time as described above.

The UE performs the second channel sensing operation at the start time set to perform the second channel sensing operation (operation 915). Thereafter, the UE determines whether the sensed channel is in the idle state (operation 917), and if in the idle state, sends the signal through the channel sensed by the second channel sensing operation (operation 919). In contrast, unless the sensed channel is in the idle state, the UE goes back to operation 903 to receive scheduling information for uplink transmission for signal transmission from the base station.

Thus, the UE may be configured to sense a channel at different start times depending on whether the signal to be transmitted contains a data signal. The UE may enhance the capability for a channel sensing operation on the unlicensed band by clearly defining references for setting a start time to perform the channel sensing operation.

Methods for performing channel sensing operations by a base station and UE have been described above with reference to FIGS. 8 and 9. Now described with reference to FIGS. 10 and 11 are the respective internal structures of a UE and base station performing a channel sensing operation in a communication system according to an embodiment of the present disclosure.

Figure 10:
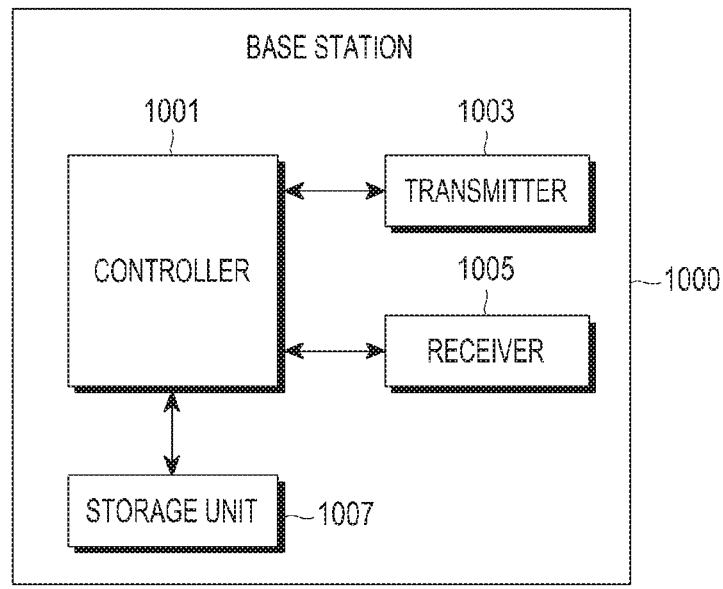
FIG. 10 illustrates an internal configuration of an apparatus for performing a channel sensing operation in a base station of a communication system according to an embodiment of the present disclosure.
Figure 11:
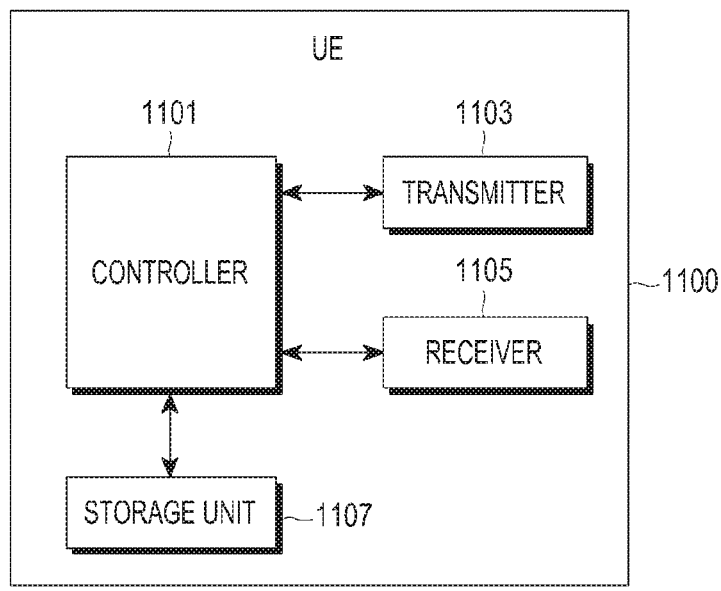
FIG. 11 illustrates an internal configuration of an apparatus for performing a channel sensing operation in a UE of a communication system according to an embodiment of the present disclosure.

FIG. 10 is a view illustrating an internal configuration of an apparatus for performing a channel sensing operation in a base station of a communication system according to an embodiment of the present disclosure.

Referring to FIG. 10, a base station 1000 includes a controller 1001, a transmitter 1003, a receiver 1005, and a storage unit 1007.

The controller 1001 controls the overall operation of the base station 1000, particularly, operations related to a channel sensing operation according to an embodiment of the present disclosure. The operations related to the channel sensing operation according to an embodiment of the present disclosure are the same as those described above in connection with FIGS. 1A to 9, and no detailed description thereof is repeated.

The transmitter 1003 transmits various signals and messages to other entities included in the communication system under the control of the controller 1001. Here, the signals and messages transmitted by the transmitter 1003 are the same as those described above in connection with FIGS. 1A to 9, and no detailed description thereof is repeated.

The receiver 1005 receives various signals and messages from other entities included in the communication system under the control of the controller 1001. Here, the signals and messages received by the receiver 1005 are the same as those described above in connection with FIGS. 1A to 9, and no detailed description thereof is repeated.

The storage unit 1007 stores programs and various data related to operations for performing the channel sensing operation by the base station 1000 under the control of the controller 1001 according to an embodiment of the present disclosure. The storage unit 1007 stores various signals and messages received by the receiver 1005 from other entities.

Although FIG. 10 illustrates that the base station 1000 includes separate units, such as the controller 1001, the transmitter 1003, the receiver 1005, and the storage unit 1007, the base station 1000 may be implemented in such a manner that at least two of the controller 1001, the transmitter 1003, the receiver 1005, and the storage unit 1007 are integrated together. Further, the base station 1000 may be implemented in a single processor.

FIG. 11 is a view illustrating an internal configuration of an apparatus for performing a channel sensing operation in a UE of a communication system according to an embodiment of the present disclosure.

Referring to FIG. 11, a UE 1100 includes a controller 1101, a transmitter 1103, a receiver 1105, and a storage unit 1107.

The controller 1101 controls the overall operation of the UE 1100, particularly, operations related to a channel sensing operation according to an embodiment of the present disclosure. The operations related to the channel sensing operation according to an embodiment of the present disclosure are the same as those described above in connection with FIGS. 1A to 9, and no detailed description thereof is repeated.

The transmitter 1103 transmits various signals and messages to other entities included in the communication system under the control of the controller 1101. Here, the signals and messages transmitted by the transmitter 1103 are the same as those described above in connection with FIGS. 1A to 9, and no detailed description thereof is repeated.

The receiver 1105 receives various signals and messages from other entities included in the communication system under the control of the controller 1101. Here, the signals and messages received by the receiver 1105 are the same as those described above in connection with FIGS. 1A to 9, and no detailed description thereof is repeated.

The storage unit 1107 stores programs and various data related to operations for performing the channel sensing operation by the UE 1100 under the control of the controller 1101 according to an embodiment of the present disclosure. The storage unit 1107 stores various signals and messages received by the receiver 1105 from other entities.

Although FIG. 11 illustrates that the UE 1100 includes separate units, such as the controller 1101, the transmitter 1103, the receiver 1105, and the storage unit 1107, the UE 1100 may be implemented in such a manner that at least two of the controller 1101, the transmitter 1103, the receiver 1105, and the storage unit 1107 are integrated together. Further, the UE 1100 may be implemented in a single processor.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for sensing a channel by a base station in a communication system, the method comprising:
    identifying a channel sensing interval;
    based on a transmission start time when the base station starts a signal transmission on an unlicensed band and the identified channel sensing interval, determining a sensing start time; and
    performing a channel sensing operation on a channel in the unlicensed band during the channel sensing interval starting at the determined sensing start time,
    wherein the channel sensing interval is set differently according to whether the signal transmission is to include a data signal or a reference signal.

2. The method of claim 1, wherein the sensing start time is determined using a preset method, wherein the preset method comprises at least one of:
    determining, as the sensing start time, a time that comes the identified channel sensing interval earlier than the transmission start time,
    determining, as the sensing start time, a start time of a symbol contained in the time that comes the identified channel sensing interval earlier than the transmission start time, or
    determining, as the sensing start time, a start time of a symbol present ahead of the time that comes the identified channel sensing interval earlier than the transmission start time.

3. The method of claim 1, wherein the channel sensing interval is set based on at least one of a length of slots or a time minimally required to perform the channel sensing operation.

4. The method of claim 1, further comprising, in response to the channel sensed as a result of performing the channel sensing operation being in an idle state, transmitting a signal through the sensed channel.

5. A method for sensing a channel by a user equipment (UE) in a communication system, the method comprising:
   receiving, from a base station, information for identifying a channel sensing interval;
   determining the channel sensing interval based on the received information;
   based on a transmission start time when the UE starts a signal transmission on an unlicensed band and the identified channel sensing interval, determining a sensing start time; and
   performing a channel sensing operation on a channel in the unlicensed band during the channel sensing interval starting at the determined sensing start time,
   wherein the channel sensing interval is set differently according to whether the signal transmission is to include a data signal or a reference signal.

6. The method of claim 5, wherein the sensing start time is determined using a preset method, wherein the preset method comprises at least one of:
   determining, as the sensing start time, a time that comes the identified channel sensing interval earlier than the transmission start time,
   determining, as the sensing start time, a start time of a symbol contained in the time that comes the identified channel sensing interval earlier than the transmission start time, or
   determining, as the sensing start time, a start time of a symbol present ahead of the time that comes the identified channel sensing interval earlier than the transmission start time.

7. The method of claim 5, wherein the channel sensing interval is set based on at least one of a length of a slot, or a time minimally required to perform the channel sensing operation.

8. The method of claim 5, further comprising:
   in response to the channel sensed as a result of performing the channel sensing operation being in an idle state, transmitting a signal through the sensed channel.

9. A base station sensing a channel in a communication system, the base station comprising:
   a transceiver; and
   a controller coupled with the transceiver and configured to:
      identify a channel sensing interval,
      based on a transmission start time when the base station starts a signal transmission on an unlicensed band and the identified channel sensing interval, determine a sensing start time,
      performing a channel sensing operation on a channel in the unlicensed band during the channel sensing interval starting at the determined sensing start time, and transmit a signal through a sensed channel
   wherein the channel sensing interval is set differently according to whether the signal transmission is to include a data signal or a reference signal.

10. The base station of claim 9, wherein the sensing start time is determined by a preset method, wherein the preset method comprises at least one of:
   determining, as the sensing start time, a time that comes the identified channel sensing interval earlier than the transmission start time,
   determining, as the sensing start time, a start time of a symbol contained in the time that comes the identified channel sensing interval earlier than the transmission start time, or
   determining, as the sensing start time, a start time of a symbol present ahead of the time that comes the identified channel sensing interval earlier than the transmission start time.

11. The base station of claim 9, wherein the channel sensing interval is set based on at least one of a length of slots or a time minimally required to perform the channel sensing operation.

12. The base station of claim 9, wherein, in response to the channel sensed as a result of performing the channel sensing operation being in an idle state, the controller is further configured to transmit a signal through the sensed channel.

13. A user equipment (UE) sensing a channel in a communication system, the UE comprising:
   a transceiver; and
   a controller coupled with the transceiver and configured to:
      receive, from a base station, information for identifying a channel sensing interval,
      determine the channel sensing interval based on the received information,
      based on a transmission start time when the UE starts a signal transmission on an unlicensed band and the identified channel sensing interval, determine a sensing start time, and
      performing a channel sensing operation on a channel in the unlicensed band during the channel sensing interval starting at the determined sensing start time,
   wherein the channel sensing interval is set differently according to whether the signal transmission is to include a data signal or a reference signal.

14. The UE of claim 13, wherein the sensing start time is determined by a preset method, wherein the preset method comprises at least one of:
   determining, as the sensing start time, a time that comes the identified channel sensing interval earlier than the transmission start time,
   determining, as the sensing start time, a start time of a symbol contained in the time that comes the identified channel sensing interval earlier than the transmission start time, or
   determining, as the sensing start time, a start time of a symbol present ahead of the time that comes the identified channel sensing interval earlier than the transmission start time.

15. The UE of claim 13, wherein the channel sensing interval is set based on at least one of a length of a slot or a time minimally required to perform the channel sensing operation.

16. The UE of claim 13, wherein, in response to the channel sensed as a result of performing the channel sensing operation being in an idle state, the controller is further configured to transmit a signal through the sensed channel.

* * * * *